(12) United States Patent
Magyari

(10) Patent No.: US 10,078,223 B2
(45) Date of Patent: Sep. 18, 2018

(54) HEAD MOUNTED DISPLAY WITH NON-PUPIL FORMING OPTICAL PATH

(71) Applicant: IMMY Inc., Troy, MI (US)

(72) Inventor: Douglas Peter Magyari, Royal Oak, MI (US)

(73) Assignee: IMMY INC., Troy, MI (US)

( * ) Notice: Subject to any disclaimer, the term of this patent is extended or adjusted under 35 U.S.C. 154(b) by 0 days.

(21) Appl. No.: 14/214,330

(22) Filed: Mar. 14, 2014

(65) Prior Publication Data

US 2014/0266986 A1 Sep. 18, 2014

Related U.S. Application Data

(60) Provisional application No. 61/799,017, filed on Mar. 15, 2013.

(51) Int. Cl.
    *G09G 5/00* (2006.01)
    *G02B 27/01* (2006.01)
    (Continued)

(52) U.S. Cl.
    CPC ........... *G02B 27/0176* (2013.01); *G02B 5/10* (2013.01); *G02B 7/004* (2013.01); *G02B 7/04* (2013.01);
    (Continued)

(58) Field of Classification Search
None
See application file for complete search history.

(56) References Cited

U.S. PATENT DOCUMENTS

| | | |
|---|---|---|
| 3,923,370 A | 12/1975 | Mostrom |
| 4,352,951 A | 10/1982 | Kyle |

(Continued)

FOREIGN PATENT DOCUMENTS

| | | |
|---|---|---|
| EP | 0460983 | 12/1991 |
| EP | 0632303 | 1/1995 |

(Continued)

OTHER PUBLICATIONS

Final Office Action for U.S. Appl. No. 13/510,423 dated May 21, 2015 (18 pages).

(Continued)

*Primary Examiner* — Ifedayo Iluyomade
(74) *Attorney, Agent, or Firm* — Dicke, Billig & Czaja, PLLC

(57) ABSTRACT

A head mounted display device includes a structural frame arranged generally along a X-axis and a Y-axis for viewing along a Z-axis, the X, Y, and Z axes being mutually perpendicular. A micro-display is coupled to the structural frame, and configured to project visual content in a substantially forward direction along the Z-axis away from a user. A group of one or more optical elements with reflective optical surfaces is coupled to the structural frame and respectively positioned on a front side of the micro-display to reflectively guide a light ray bundle in a non-pupil forming optical path from the micro-display to a user's eye to provide an image to the user's eye such that the light rays of the light ray bundle entering the user's eye are essentially parallel to make the image visible to the user with varied positions of the user's pupil.

20 Claims, 21 Drawing Sheets

(51) Int. Cl.
  *G02B 7/00*   (2006.01)
  *G02B 7/04*   (2006.01)
  *G02B 17/06*  (2006.01)
  *G02B 7/182*  (2006.01)
  *G02B 5/10*   (2006.01)

(52) U.S. Cl.
  CPC ....... *G02B 7/1822* (2013.01); *G02B 17/0642* (2013.01); *G02B 17/0663* (2013.01); *G02B 27/017* (2013.01); *G02B 27/0172* (2013.01); *G02B 2027/015* (2013.01); *G02B 2027/0123* (2013.01); *G02B 2027/0132* (2013.01); *G02B 2027/0178* (2013.01); *Y10T 29/49464* (2015.01); *Y10T 29/49826* (2015.01)

(56) References Cited

U.S. PATENT DOCUMENTS

| | | | |
|---|---|---|---|
| 5,093,567 | A | 3/1992 | Staveley |
| 5,334,991 | A | 8/1994 | Wells et al. |
| 5,543,968 | A | 8/1996 | Freeman et al. |
| 5,598,231 | A | 1/1997 | Lin |
| 5,663,833 | A | 9/1997 | Nanba et al. |
| 5,699,194 | A | 12/1997 | Takahashi |
| 5,701,202 | A | 12/1997 | Takahashi |
| 5,706,136 | A | 1/1998 | Okuyama et al. |
| 5,844,530 | A | 12/1998 | Tosaki |
| 5,880,888 | A | 3/1999 | Schoenmakers et al. |
| 5,886,822 | A | 3/1999 | Spitzer |
| 5,886,824 | A | 3/1999 | Takahashi |
| 5,903,243 | A | 5/1999 | Jones |
| 6,046,857 | A | 4/2000 | Morishima |
| 6,084,555 | A | 7/2000 | Mizoguchi et al. |
| 6,147,807 | A | 11/2000 | Droessler et al. |
| 6,204,974 | B1 | 3/2001 | Spitzer |
| 6,292,301 | B1 | 9/2001 | Kuramochi et al. |
| 6,310,728 | B1 | 10/2001 | Okuyama et al. |
| 6,369,952 | B1 | 4/2002 | Rallison et al. |
| 6,417,970 | B1 | 7/2002 | Travers et al. |
| 6,538,624 | B1 | 3/2003 | Karasawa et al. |
| 6,573,952 | B1 | 6/2003 | Yamazaki et al. |
| 6,618,099 | B1 | 9/2003 | Spitzer |
| 6,683,584 | B2 | 1/2004 | Ronzani et al. |
| 7,310,072 | B2 | 12/2007 | Ronzani et al. |
| 7,724,210 | B2 | 5/2010 | Sprague et al. |
| 8,040,292 | B2 | 10/2011 | Ronzani et al. |
| 8,705,177 | B1 | 4/2014 | Miao |
| 9,151,954 | B2 | 10/2015 | Magyari et al. |
| 9,250,444 | B2 | 2/2016 | Magyari |
| 9,268,139 | B2 | 2/2016 | Magyari |
| 2004/0057138 | A1 | 3/2004 | Tanijiri et al. |
| 2004/0070839 | A1 | 4/2004 | Yagi et al. |
| 2004/0113867 | A1 | 6/2004 | Tomine et al. |
| 2004/0114256 | A1 | 6/2004 | Matsuo |
| 2008/0170119 | A1 | 7/2008 | McCann |
| 2009/0180194 | A1 | 7/2009 | Yamaguchi et al. |
| 2009/0211776 | A1 | 8/2009 | Shimoyoshi et al. |
| 2009/0268287 | A1 | 10/2009 | Buchon et al. |
| 2010/0188738 | A1* | 7/2010 | Epple ................ G02B 17/0631 359/365 |
| 2011/0062461 | A1 | 3/2011 | Yamazaki et al. |
| 2012/0105310 | A1 | 5/2012 | Sverdrup et al. |
| 2012/0120498 | A1* | 5/2012 | Harrison ................ G02B 3/08 359/630 |
| 2012/0139817 | A1 | 6/2012 | Freeman |
| 2012/0154920 | A1 | 6/2012 | Harrison et al. |
| 2012/0229367 | A1* | 9/2012 | Magyari ............ G02B 27/0172 345/8 |
| 2014/0266986 | A1* | 9/2014 | Magyari ............ G02B 27/0172 345/8 |
| 2014/0266987 | A1 | 9/2014 | Magyari |
| 2014/0320972 | A1 | 10/2014 | Magyari et al. |
| 2014/0320974 | A1 | 10/2014 | Magyari |

FOREIGN PATENT DOCUMENTS

| | | | |
|---|---|---|---|
| EP | 1258771 | 11/2002 | |
| EP | 1271188 | 1/2003 | |
| GB | 2295938 | 12/1996 | |
| JP | 05-080331 | 4/1993 | |
| JP | 07-191274 | 7/1995 | |
| JP | 08-152591 | 6/1996 | |
| JP | H08286140 | 11/1996 | |
| JP | 09-090271 | 4/1997 | |
| JP | 09-189880 | 7/1997 | |
| JP | H09197337 | 7/1997 | |
| JP | 09-508711 | 9/1997 | |
| JP | H10319240 | 12/1998 | |
| JP | H11326823 | 11/1999 | |
| JP | 2002504710 | 2/2002 | |
| JP | 2003-41382 | 2/2003 | |
| JP | 2004184773 | 7/2004 | |
| JP | 2004-234015 | 8/2004 | |
| JP | 2004226469 | 8/2004 | |
| WO | 0055676 | 9/2000 | |
| WO | 2007003691 | 1/2007 | |
| WO | 2007116511 | 10/2007 | |
| WO | WO/2011062591 | * 11/2009 | ............ G09G 5/00 |
| WO | 2011062591 | 5/2011 | |

OTHER PUBLICATIONS

Non-Final Office Action for U.S. Appl. No. 14/213,996 dated Apr. 10, 2015 (14 pages).
Notice of Allowance for U.S. Appl. No. 14/214,290 dated Apr. 29, 2015 (28 pages).
Final Office Action for U.S. Appl. No. 14/214,346 dated Jun. 26, 2015 (25 pages).
Notice of Allowance for U.S. Appl. No. 14/213,996 dated Aug. 4, 2015 (13 pages).
International Search Report and the Written Opinion for International Application No. PCT/US2014/029714 dated Jun. 17, 2014 (10 pages).
International Search Report and the Written Opinion for International Application No. PCT/US2014/029719 dated Jun. 17, 2014 (10 pages).
International Search Report and the Written Opinion for International Application No. PCT/US2014/029725 dated Jun. 17, 2014 (13 pages).
International Search Report and the Written Opinion for International Application No. PCT/US2014/029708 dated Jun. 17, 2014 (12 pages).
Office Action for U.S. Appl. No. 14/214,346 dated Mar. 13, 2015 (34 pages).
Notice of Allowance for U.S. Appl. No. 14/213,996 dated Feb. 4, 2015 (18 pages).
International Preliminary Report on Patentability and Written Opinion of the International Preliminary Examining Authority for International Application No. PCT/US2014/29714 dated Mar. 3, 2015 (7 pages).
International Preliminary Report on Patentability for International Application No. PCT/US2014/29719 dated Mar. 11, 2015 (8 pages).
International Preliminary Report on Patentability for International Application No. PCT/US2014/29725 dated Mar. 10, 2015 (8 pages).
International Preliminary Report on Patentability for International Application No. PCT/US2014/29708 dated Mar. 12, 2015 (10 pages).
International Preliminary Report on Patentability for International Application No. PCT/US2009/065420 dated May 22, 2012 (8 pages).
International Search Report and Written Opinion for International Application No. PCT/US2009/065420 dated Jan. 19, 2010 (10 pages).
Office Action (Notification of Reasons for Refusal) for Japanese Patent Application Publication No. 2012-539860 dated Oct. 15, 2013 (4 pages).

(56) References Cited

OTHER PUBLICATIONS

English translation of Office Action for Mexican National Stage Patent Application No. MX/a/2012/005855 dated Feb. 27, 2013 (claiming priority to International Application No. PCT/US2009/065420) (5 pages).
"Sony HMZ-T1 Personal 3D Viewer" Retrieved from the Internet: URL:http://store.sony.com/p/Wearable-HDTV/en/p/HMZT1 Sony Product; HMZ-T3W 3D Personal Viewer- http://store.sony.com/wearable-hdlv-2d-3d-virtual-7.1-surround-sound- zid27 -H MZT3W /cat-27 -calid-3 D-Personal-Viewer;pg id=xxxxxxxxxxxxxxxxxxxxxxxxxxxxxxxxxxxx?t=pfm%3Dcategory %26pfmvalue%3Dfaceted [retrieved on Jan. 15, 2014] (4 pages).
"Vuzix Wrap 920AR" Retrieved from the Internet: URL:http://www.vuzix.com/augmented-reality/products_wrap920ar.html [retrieved on Jan. 15, 2014] (2 pages).
"Vuzix Star 1200" Retrieved from the Internet: URL:http://www.vuzix.com/augmented-reality/products_star1200.html [retrieved on Jan. 15, 2014] (2 pages).
"Vuzix Star 1200XL" Retrieved from the Internet: U RL:http://www. vuzix. com/augmented-reality/products_star1200xl. html [retrieved on Jan. 15, 2014] (2 pages).
"Vuzix Wrap 1200VR" Retrieved from the Internet: U RL:http://www. vuzix. com/consumer/products_ wrap_ 1200vr. html [retrieved on Jan. 15, 2014] (2 pages).
"Vuzix Wrap 1200" Retrieved from the Internet: U RL: http://www.vuzix.com/consumer/products wrap_ 1200. html [retrieved on Jan. 15, 2014] (2 pages).
"1-0ptik" by Inovega, inc. Retrieved from the Internet: URL:http://innovega-inc.com/how-it-compares.php [retrieved on Jan. 15, 2014] (1 page).
Restriction Requirement for U.S. Appl. No. 13/510,423 dated Apr. 16, 2014 (6 pgs.).
Office Action for U.S. Appl. No. 13/510,423 dated Sep. 22, 2014 (14 pgs.).
Office Action for U.S. Appl. No. 14/213,996 dated Sep. 9, 2014 (9 pgs.).
Office Action for U.S. Appl. No. 14/214,290 dated Sep. 25, 2014 (10 pgs.).
H. Hoshi, et .al, "Off-axial HMD optical system consisting of aspherical surfaces without rotational symmetry," SPIE vol. 2653, 234 (1996).
S. Yamazaki, et al., "Thin wide-field-of-view HMD with free-form-surface prism and applications," Proc. SPIE, vol. 3639, 453 (1999).
Cakmakci, et al.,"Optimal local shape description for rotationally non-symmetric optical surface design and analysis," Opt. Express 16, 1583-1589 (2008).
D. Cheng, et al., "Design of a lightweight and wide field-of-view HMD system with free form surface prism," Infrared and Laser Engineering, vol. 36, 3 (2007).
Final Office Action for U.S. Appl. No. 14/214,346 dated Mar. 23, 2016 (26 pgs.).
Notice of Allowance for U.S. Appl. No. 13/510,423 dated Oct. 14, 2015 (13 pages).
Notice of Allowance for U.S. Appl. No. 14/213,996 dated Aug. 14, 2015 (13 pages).
Office Action for U.S. Appl. No. 14/214,290 dated Aug. 20, 2015 (21 pages).
Notice of Allowance for U.S. Appl. No. 14/214,290 dated Dec. 3, 2015 (17 pages).
Office Action for U.S. Appl. No. 14/214,346 dated Nov. 19, 2015 (27 pages).
Final Office Action for U.S. Appl. No. 14/214,346 dated Jul. 11, 2016 (27 pgs.).
Applicant-Initiated Interview Summary for U.S. Appl. No. 14/214,346 dated Oct. 17, 2016 (4 pgs.).
Office Action for U.S. Appl. No. 14/214,346 dated Mar. 9, 2017 (29 pgs.).
Applicant-Initiated Interview Summary for U.S. Appl. No. 14/214,346 dated Jul. 17, 2016 (9 pgs.).
Final Office Action for U.S. Appl. No. 14/214,346 dated Nov. 2, 2017 (31 pgs.).
Office Action for U.S. Appl. No. 14/214,346 dated May 22, 2018 (32 pgs.).

* cited by examiner

HEAD MOUNTED DISPLAY WITH NON-PUPIL FORMING OPTICAL PATH

CROSS-REFERENCE TO RELATED APPLICATIONS

This Utility patent application claims priority to U.S. Provisional Patent Application No. 61/799,017, filed Mar. 15, 2013, which is incorporated herein by reference. This Utility patent application is related to U.S. Utility patent application Ser. No. 13/510,423 PCT filed on Nov. 21, 2009 and § 371 date of May 17, 2012, and Utility patent applications filed on even date herewith having 14/213,996 entitled "Head Mounted Display Having Alignment Maintained via Structural Frame", 14/214,290 entitled "Head Mounted Display with Micro-Display Alignment Mechanism", and 14/214,346 entitled "Head Mounted Display Assembly", all of which are incorporated herein by reference.

BACKGROUND

Head mounted display (HMD) devices are employed for displaying and viewing visual content from a visual display source. An HMD device is configured to be worn on a user's head. An HMD device typically has (1) a single small display optic located in front of one of the user's eyes (monocular HMD), or (2) two small display optics, with each one being located in front of each of the user's two eyes (bi-ocular HMD), for viewing a wide range of visual display content by a single user. A bi-ocular HMD allows for the possibility that the user may view visual content in 3-dimensions. The HMD devices that can currently be found in today's military, commercial, and consumer markets are primarily goggles/eyeglasses type devices that are worn the way a pair of goggles or eyeglasses are worn, or they are helmet-mounted devices that are attached to a helmet that is worn on the user's head. Additionally, the HMD devices that can currently be found in today's market primarily rely on three different technologies, and thus typically fall into three different categories: refractive; diffractive; and laser writer.

A first category of HMD devices currently found on the market is the refractive HMD. Refractive HMD's use the optical physics principle of refraction in order to transmit the projection of visual content from a visual display source to a user's eye. Refractive HMD's work by transmitting a projection of visual content from a display source through a light transmission medium, typically a transparent plastic such as acrylic, to produce a final coherent and often magnified image to the user's eye. The light transmission medium is essentially a lens or series of lenses that bend and magnify the light waves from the visual source as they enter and exit the transmission medium so as to form the magnified cohesive image, similar to the operation of a magnifying glass. This is the dominant methodology employed in most HMD's on the market today.

While the refractive HMD may be the dominant methodology used in the HMD market, it does have several drawbacks. The problem with such refractive HMD's is that, with the transmission medium typically being large blocks of heavy plastic located in the optical path of the HMD, this type of HMD is very heavy, bulky, and cumbersome for a user to wear on either his head or face. This limits the overall comfort for the user wearing such an HMD. In addition, such a bulkier fit for the user significantly limits the styling that may be applied to such a device. Furthermore, because the refractive lenses of refractive HMD's are often located in the user's direct field of view, creating a refractive HMD that gives a user adequate "see-through vision," or the ability to simultaneously see the projected visual content and at the same time clearly see through the projected content to the real-world outside surrounding environment, a "mixed-reality" view, becomes very complicated. Another drawback of refractive HMD's is that they can often prevent a user from seeing anything other than the projected visual content or can severely limit a user's peripheral vision, which can ultimately leave the user feeling claustrophobic. A further drawback of refractive HMD's is that, for those commonly found in the consumer or commercial markets, they have a very limited field-of-view (FOV) angle, with the typical FOV being about 25-degrees and the high-end FOV being about 40-degrees. When trying to increase the FOV of refractive HMD's commonly found in the consumer and commercial markets above the typical FOV of 25-degrees, the cost and weight of the device increases dramatically, which can be a significant prohibitive factor in two already competitive markets. This situation is apparent in the military market where refractive HMD's with FOV's between 40-degrees and 120-degrees are much more common, however as previously stated, they are extremely heavy and very expensive.

A second category of HMD devices currently found on the market is the diffractive HMD, or more accurately, a hybrid refractive/diffractive HMD. Diffractive HMD's use the optical physics principle of diffraction and diffraction gratings as well as refraction in order to transmit the projection of visual content from a visual display source to a user's eye. With this type of HMD, the projection of the visual content is passed through both a transmission medium and a diffraction grating contained within one of the refractive transmission medium elements to produce a final coherent and often magnified image to the user's eye. The light waves from the projected visual content that are passing through the transmission medium ultimately pass through or are reflected from the diffraction grating, which serves to present a single coherent image to the user. Various drawbacks to such hybrid HMD systems include bulkiness, high power light source requirements, and a limited field of view. These all limit their utility for military and industrial applications as well as their appeal for consumer applications.

A third category of HMD devices currently found on the market is the laser-writer HMD. The laser-writer HMD uses a remote laser light engine, often including a triad of red, green, and blue lasers, and a set of laser writers to bend and beam the laser lights, according to an input visual display signal, into a coherent visual image. The lasers and laser writer are connected to a head mounted display unit by coherent fiber optic cable in order to transmit the images to the head mounted unit. The images are then projected from the coherent fiber optic cable onto the final viewing screen, typically a transparent lens in the HMD unit, for viewing by the user. One drawback associated with this type of HMD is that the coherent fiber optic cable employed for such a system is very expensive. Another downside to such HMD systems is that, as the image comes out of the fiber optic cable, the head unit will still need some type of refractive optic to magnify the image, which in turn translates to a limited FOV and increased weight of the head unit. Furthermore, another downside related to laser-writer HMD's becomes apparent when using such a system to view visual content in 3D. To do so, the HMD system would typically either beam two distinct images to the head unit at the same time over a single fiber optic cable, thus the head unit would incorporate a beam splitter to separate the two images for each eye, or the HMD system would employ a second laser system working simultaneously with the first laser system in order to produce the second image employed to deliver 3D visual content. In either case, this can become extremely expensive. An additional downside to the laser-writer HMD device is that the power consumption to run such a device is extremely high. Lastly, transmitting an image to the head mounted unit via fiber optic cables can be potentially problematic if care is not taken to observe minimum bend radius of the fiber optic cable. If the cable is bent at too tight a radius, this will result in significant signal losses.

None of the above three categories of HMD systems that are available today are capable of providing magnified coherent visual content for viewing by a user from a single device that is all at once inexpensive, lightweight, comfortable, and that can be considered a near-to-eye HMD device. Consequently, because of the shortcomings and problems associated with the three types of systems currently available, there is a need in the industry for a new type of HMD device that is fairly inexpensive, lightweight, compact, comfortable, and is a near-to-eye device.

Optical Path

As discussed above, in HMD devices available today, the optical path typically involves refractive optics that are ineffective, heavy, and/or bulky. In augmented reality systems, optical see-through head-mounted displays ("OST-HMD's") have been one of the basic vehicles for combining a computer-generated virtual scene with the views of a real-world scene. Typically, through use of an optical combiner, an OST-HMD maintains a direct view of the physical world and optically superimposes computer-generated images onto the real scene. Compared with a video see-though approach, in which the real-world views are captured by cameras, the OST-HMD has the advantage of introducing minimal degradation to the real world scene or providing a more accurate view. Therefore an OST-HMD is typically preferred for applications where a non-blocked real-world view is critical.

Designing an OST-HMD that has a wide FOV, a low F-number (which, in optics is also referred to as the focal ratio and is the ratio of the focal length to the diameter of the entrance pupil), is compact, and is nonintrusive has been a great challenge. Designing such an OST-HMD has been especially difficult to achieve with a non-pupil forming system, wherein the light rays from the image that enter the eye are essentially parallel, so an eye does not need to be located at a particular location to see the image formed by the light rays. Such a non-pupil forming system is in contrast to pupil-forming systems wherein the light rays converge to a definite point in space, and if an eye is positioned in front of or behind this point the image will not be visible. The typical eyepiece structure of HMD's available today uses rotationally symmetric components that are limited in their ability to achieve a low F-number, large eye relief, and wide FOV. Many methods have been explored to achieve an HMD optical system which fulfills the above highly desirable characteristics. These methods include: applying catadioptric techniques (techniques involving both refractive and reflective optics); introducing new elements, such as aspherical surfaces, holographic optical components, and diffractive optical components; exploring new design principles, such as using projection optics to replace an eyepiece or microscope type lens system in a conventional HMD design; and introducing tilt and decenter, or even free-form surfaces (FFS). (see, e.g., H. Hoshi, et. al, "Off-axial HMD optical system consisting of aspherical surfaces without rotational symmetry," SPIE Vol. 2653, 234 (1996); and S. Yamazaki, et al., "Thin wide-field-of-view HMD with free-form-surface prism and applications," Proc. SPIE, Vol. 3639, 453 (1999).).

Among the different methods mentioned above, free-form surfaces demonstrate great promise in designing compact HMD systems. It is challenging, however, to design a free-form prism based OST-HMD offering a wide FOV, low F-number, and sufficient eye relief. Many attempts have been made to design HMD's using FFS's, particularly in designs based on a wedge-shaped prism (see U.S. Pat. Nos. 5,699,194; 5,701,202; 5,706,136; and D. Cheng, et al., "Design of a lightweight and wide field-of-view HMD system with free form surface prism," Infrared and Laser Engineering, Vol. 36, 3 (2007).). For instance, Hoshi et al. presented an FFS prism offering an FOV of 34° and a thickness of 15 mm. Yamazaki et al. described a 51° OST-HMD design consisting of a FFS prism and an auxiliary lens attached to the FFS prism. More recently, Cakmakci et al. designed a 20° HMD system with one free-form reflecting surface which was based on rational radial basis function and a diffractive lens. ("Optimal local shape description for rotationally non-symmetric optical surface design and analysis," Opt. Express 16, 1583-1589 (2008)). There are also several commercially available HMD products based on the FFS prism concept. For instance, Olympus released their Eye-Trek series of HMD's based on free-form prisms. Emagin carried Z800 with the optical module WFO5. Daeyang carried i-Visor FX series (GEOMC module, A3 prism) products. Rockwell Collins announced the ProView SL40 using the prism technology of OEM display optics.

Existing FFS-based designs have an exit pupil diameter that is typically in the range of 4 mm to 8 mm, with a FOV typically around 40-degrees or less. In the more recent designs, smaller micro-displays, typically around 0.6", were adopted, which employ a focal length of around 21 mm to achieve a 40-degree FOV. The reduced focal length makes it very challenging to design a system with a large exit pupil, or the virtual aperture in an optical system. As a result, most of the designs compromise the exit pupil diameter. Thus, commercially available products on average reduce the exit pupil diameter to being within a range of about 3 mm to about 5 mm in order to maintain an F-number greater than 4. There are a few designs that achieve a larger exit pupil by introducing additional free-form elements or diffractive optical elements. For instance, Droessler and Fritz described the design of a high brightness OST-HMD system with an F-number as low as 1.7 by using two extra decentered lenses and applying one diffractive surface. (U.S. Pat. No. 6,147, 807). The existing work in the field of optics and HMD's shows that it is extremely difficult to design an HMD having both a low F-number (indicating a high magnification ratio) and a wide FOV.

Accordingly, it would be an advance in the field of optical see-through head-mounted displays to provide a head-mounted display which has a wide FOV and low F-number while also providing a compact, light-weight, and nonintrusive form factor.

Structural Support of Optical Components

An optical path for a HMD is defined by various optical elements that are held in precision alignment. A problem is how to maintain precision alignment of the optical path without undue weight and bulk. Some optical systems try to accomplish optical alignment by integrating all of the optical surfaces into a single, monolithic element, which combines both the refractive and reflective optics for the system in a single optical element. This is typically done using lens surfaces combined with prismatic optics having low internal reflection losses. These systems are heavy and bulky, and have additional manufacturing and assembly complications. Other optical approaches utilize individual optical elements which must be accurately aligned, both radially and longitudinally. Another approach utilizes a light waveguide, such as for example optical fiber or rectangular waveguides, to try and control alignment errors, which method ultimately provides very small FOV's.

A practical HMD needs to be small and light for user comfort, as in a pair of eye glasses. Most eye glass frames are flexible and do not provide precision alignment suitable for a HMD. What is needed is a lightweight eye glass configuration that is capable of providing a precision alignment to an optical path, and to accommodate multiple industrial designs without affecting the support or alignment of the optical elements.

Micro-Display Mechanism

An HMD includes an optical path between a display and a user's eyes. Eye comfort and ease of use are of paramount concern with all HMD's. The optical path and its various design parameters are one aspect of achieving eye comfort. However, there are many factors affecting eye comfort beyond the optical elements themselves. Human factors are of great concern in proper HMD design. People's eyes vary greatly from one person to the next, and even in the same person, from eye to eye. This makes it desirable to build in additional adjustments to the HMD to facilitate maximum eye comfort. Two concerns are the accommodation for different users of varying focal points, or eye focus, and varying interpupillary distances, or the distance between the center of the pupils of a user's two eyes. Thus there is a need in HMD systems for the ability to make optical adjustments, both front to back and laterally, to account for differences among users in individual eye focal lengths and interpupillary distances. Typical existing adjustments tend to be quite bulky. What is needed is a very compact and light focusing mechanism that can fit into a lightweight HMD.

HMD Structure and Assembly Process

Among other functions, a HMD defines an optical path between a micro-display and a user's eyes. Optical components should be in precise registration with respect to one another in order to provide an acceptable image to the user. At the same time the resultant HMD should be compact and light to be acceptable to a user. The design should also be able to withstand a physical impact without adversely affecting the alignment of the optical components.

DETAILED DESCRIPTION

Figure 1:
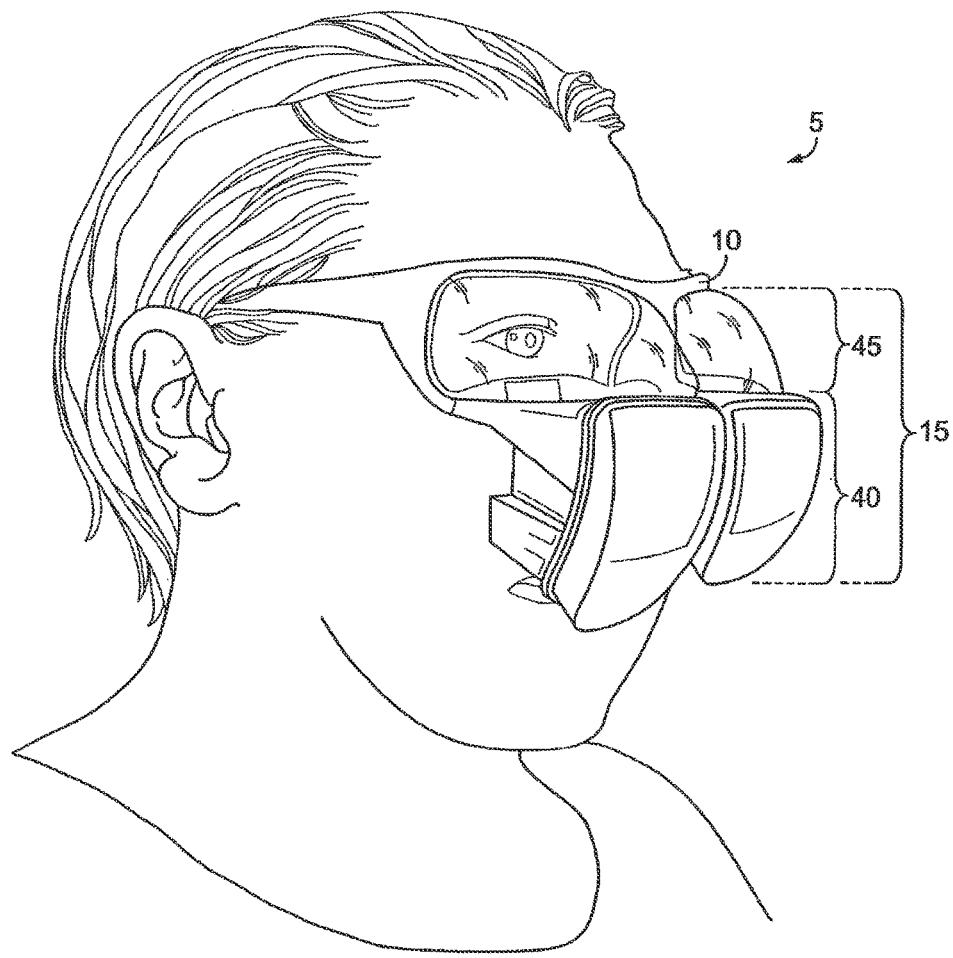
FIG. 1 is a perspective view of a user wearing a bi-ocular embodiment of the primarily reflective-based head mounted display device.

While the present invention is capable of embodiment in various forms, there is shown in the drawings, and will be hereinafter described, one or more embodiments with the understanding that the present disclosure is to be considered as an exemplification of the invention, and is not intended to limit the invention to the specific embodiments illustrated herein. Headings are provided for convenience only and are not to be construed to limit the invention in any way. Embodiments illustrated under any heading may be combined with embodiments illustrated under any other heading.

Various embodiments now will be described more fully hereinafter with reference to the accompanying drawings, which form a part hereof, and which show, by way of illustration, specific embodiments. However, this invention may be embodied in many different forms and should not be construed as limited to the embodiments set forth herein. Rather, these embodiments are provided so that this disclosure will be thorough and complete, and will fully convey the scope of the invention to those skilled in the art. The following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments may be readily combined without departing from the scope or spirit of the present disclosure.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Described herein is a primarily reflective-based head mounted display device for displaying and viewing visual content from a visual display source.

According to the present disclosure, the reflective head mounted display device includes a frame and at least one near-to-eye optics housing connected to the frame. The optics housing and frame are configured so that the optics housing may be positioned at least partially in front of an eye of a user. The optics housing includes a light-emitting visual source located within the optics housing for projecting visual content. The optics housing also includes a plurality of reflective optical surfaces disposed within the optics housing that are configured to reflect a projection of the visual content from the visual source into the eye of the user.

Accordingly, the present disclosure is primarily and substantially a reflective-based head mounted display device as opposed to a primarily refractive, diffractive, or laser-writer-based head mounted display device. In this manner, the present disclosure may optionally be a fully refractor-less head mounted display device. By primarily using a plurality of reflective optical surfaces to transmit the visual content to an eye of a user, the device may use air as the transmission medium through which the reflections pass, as opposed to heavy transparent plastic. This aspect of the present disclosure has the benefit of making the device significantly more lightweight than any other device available. It also has the benefit and distinction of being the first operational, near-to-eye, primarily reflective-based head mounted display device ever developed, as previous industry efforts to develop such a reflective-based device have been unsuccessful. Another benefit of the present disclosure is that, because the device is primarily reflective-based, the reflectors may be sized and positioned such that all of the reflectors employed to project visual content from a visual display source to a user's eye may be contained within a relatively small optics housing that is kept near-to-eye. Such a compact device eliminates the need for substantial and expensive remote systems, such as is necessary for laser-writer-based devices.

In another aspect of the present disclosure, the frame is a wearable, head mounted frame and the optical surfaces are configured to cooperatively magnify the projection of the visual content so that the visual content appears larger than the actual size of the visual source from which it is being projected. In addition, the device may include a first near-to-eye optics housing connected to the frame that is configured to be positioned in front of a first eye of a user, as well as a second near-to-eye optics housing connected to the frame that is configured to be positioned in front of a second eye of the user. In this manner, a bi-ocular head mounted display is achieved.

In another aspect of the present disclosure, the optics housing also includes a substantially opaque primary transmission housing that is connected to a substantially transparent secondary vision housing. The secondary vision housing is positioned in front of the eye of the user and is designed to allow a user to see there through. It includes a front dust cover and a outer dust cover that are both transparent. The secondary vision housing has a variably-adjustable transmission-loss layer in communication with the outer dust cover. This transmission-loss layer allows for the selectable adjustment of the amount of transmission-loss of any light passing there through. Accordingly, a user may adjust the layer so that it is fully transparent to allow viewing of all of the light passing there through, is completely dark or opaque to prevent viewing of the light passing there through, or has varying levels of darkness to allow partial viewing of the light passing there through.

In another aspect of the present disclosure, the plurality of reflective optical surfaces includes a series of reflective optical surfaces including a first reflective optical surface, at least one intermediate optical surface, and a last reflective optical surface. The last reflective optical surface may be an interior surface of the outer dust cover. The visual content is projected from the visual source to the first reflective optical surface. The visual content is then reflected to at least one intermediate optical surface, next reflected to the last reflective optical surface, which is the interior surface of the outer dust cover, and lastly reflected into the user's eye. The user can selectably choose to view only the visual content by making the adjustable transmission-loss layer, located behind the last reflective optical surface, completely dark, thus blocking out his view of the outside surroundings through the outer dust cover of the secondary vision housing. Alternatively, the user may selectably choose to have "see-through vision" and view both the visual content and the real time outside surrounding environment at the same time, a "mixed-reality" view, by setting the adjustable transmission-loss layer to have only partial darkness or opacity. In this manner, the user would then see the reflection of visual content overlaid onto their real world view of the outside surrounding environment.

In yet another aspect of the present disclosure, the head mounted display is able to achieve a large field of view with a very lightweight and compact reflective system. In one embodiment the field of view (FOV) can be more than 40 degrees in full overlap mode (left and right images have the same field of view) or more than 80 degrees in zero overlap mode (left and right view fields are unique to the left and right eyes, respectively). In another embodiment the field of view can be more than 50 degrees in full overlap mode or more than 100 degrees in zero overlap mode. In yet another embodiment the field of view can up to 60 degrees in full overlap mode or 120 degrees in zero overlap mode. In yet another embodiment the field of view can be more than 60 degrees in full overlap mode or more than 120 degrees in zero overlap mode. The degree to which a large FOV value can be realized with a lightweight and compact frame is unique to the present disclosure.

Other embodiments, objects, features and advantages will be set forth in the detailed description of the embodiments that follows, and in part will be apparent from the description, or may be learned by practice, of the claimed invention. These objects and advantages will be realized and attained by the processes and compositions particularly pointed out in the written description and claims hereof. The foregoing Summary has been made with the understanding that it is to be considered as a brief and general synopsis of some of the embodiments disclosed herein, is provided solely for the benefit and convenience of the reader, and is not intended to limit in any manner the scope, or range of equivalents, to which the appended claims are lawfully entitled.

HMD Device Construction

Figure 2:
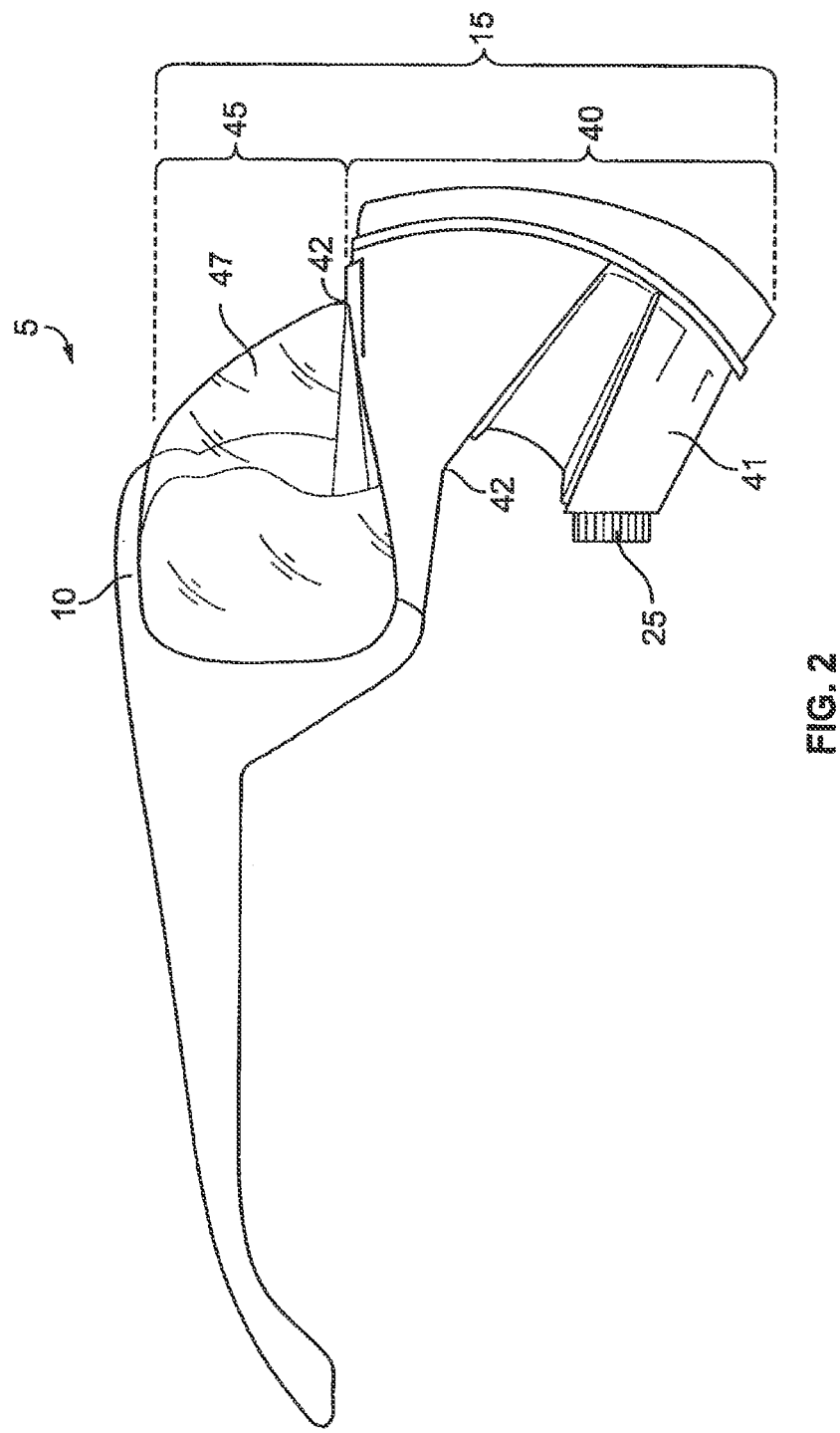
FIG. 2 is a side view of an embodiment of the primarily reflective-based head mounted display device.
Figure 5:
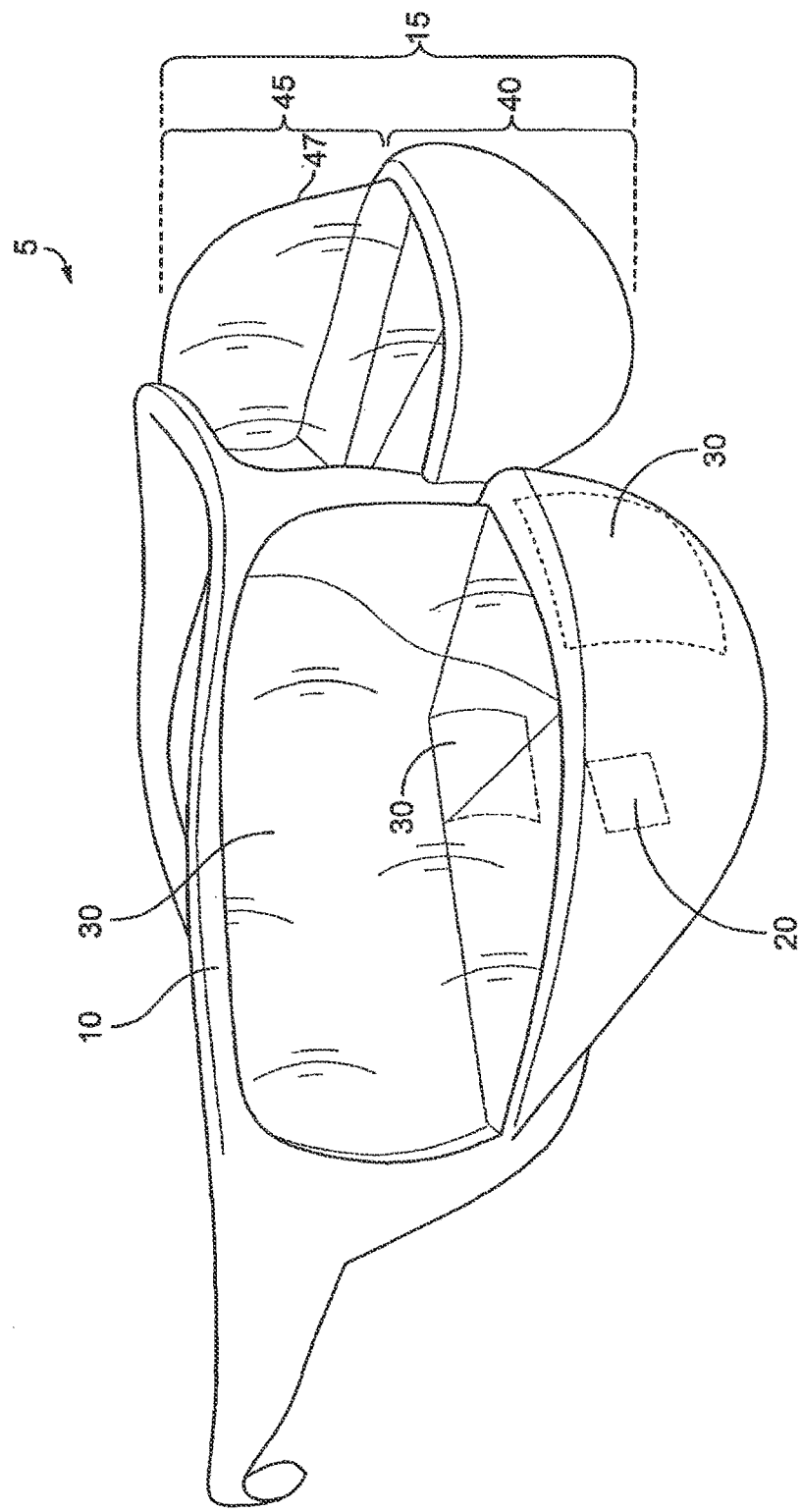
FIG. 5 is a perspective view of an alternate bi-ocular embodiment of the primarily reflective-based head mounted display device that utilizes three reflective optical surfaces.

Referring to FIGS. 1, 2 and 5, a primarily reflective-based head mounted display (HMD) device 5 for displaying and viewing visual content from a display source is disclosed. The HMD device 5 includes a frame 10 and at least one near-to-eye optics housing 15 connected to the frame 10.

In one embodiment, the frame 10 is a wearable, head mounted frame such as that of an eyeglasses frame. However, the disclosure of this embodiment should not be read to limit the shape of the frame 10. Accordingly, in alternate embodiments the frame 10 may be of any type that can be configured to be mounted to a helmet or mounted to any other similar type of head wearable device, such as a head band or adjustable head strap. The frame 10 is connected to the near-to-eye optics housing 15 and is configured to support the weight of the near-to-eye optics housing 15. The frame 10 is also configured such that the optics housing 15 may be positioned at least partially in front of an eye of a user and in the HMD user's line of sight when properly worn.

In one embodiment, the frame 10 is connected to two optics housings 15 wherein a first optics housing 15 can be placed at least partially in front of a user's first eye and a second optics housing 15 can be placed at least partially in front of a user's second eye. The first and second optics housings 15 may be physically identical, mirror images of each other, or other combinations of size and shape as may be desired. This embodiment is considered a "bi-ocular" HMD device because it is a device that utilizes two separate channels (i.e., the two separate optics housings 15) to provide separate visual content to each of a user's two eyes. Bi-ocular HMD devices can allow a user to view 2-dimensional visual content either by providing the exact same visual content over both channels to both of the user's eyes at the same time (e.g., similar to watching a television), or by providing a first visual content over a first channel to a users first eye and providing completely different second visual content over the second channel to a user's second eye (i.e., like having each eye watch a separate television with each television showing different programs), or lastly by providing visual content over a first channel to only a user's first eye and not providing any content to the user's second eye. Alternatively, bi-ocular devices can allow a user to achieve 3-dimensional stereoscopic vision (i.e., binocular vision) by providing each eye with a slightly different version of the same visual content. However, the disclosure of this embodiment should not be read to limit the HMD device 5 to only devices having two optics housings 15. Accordingly, in an alternate embodiment (not shown), the frame 10 may be connected to only one optics housing 15, wherein the frame 10 and optics housing 15 are then configured such that the one optics housing 15 can be placed partially in front of a user's first eye. The device of this alternate embodiment is considered a "monocular" HMD device because it is a device that utilizes a single channel (i.e., one optics housing 15) for only one of a user's two eyes.

In yet another alternate embodiment (not shown), the frame 10 and optics housings 15 may be configured such that the optics housings 15 are selectably attachable/detachable from the frame 10, thus allowing the user to choose whether to utilize a monocular HMD device, having only one optics housing 15 for a single eye, or a bi-ocular HMD device, having two optics housings 15, one for each of the user's eyes. In still another alternate embodiment (not shown), the optics housings 15 may be hingeably connected to the frame 10 such that the optics housings 15 can be selectably rotated about a hinge to remove the optics housings 15 from a location in front of the user's eyes and remove them from the user's line of sight.

The frame 10 is comprised of at least one durable, lightweight material such as a magnesium alloy, aluminum alloy, titanium, or any other similar lightweight metal based material that has the physical properties of being very lightweight yet very durable. However, the disclosure of the aforementioned materials should not be read to limit the lightweight materials to only metal-based materials. Accordingly, in alternate embodiments the frame 10 may be comprised of a durable lightweight material such as polycarbonate, PVC, polyethylene, nylon, or any other polymer based material that has the physical properties of being very lightweight yet very durable.

Figure 3:
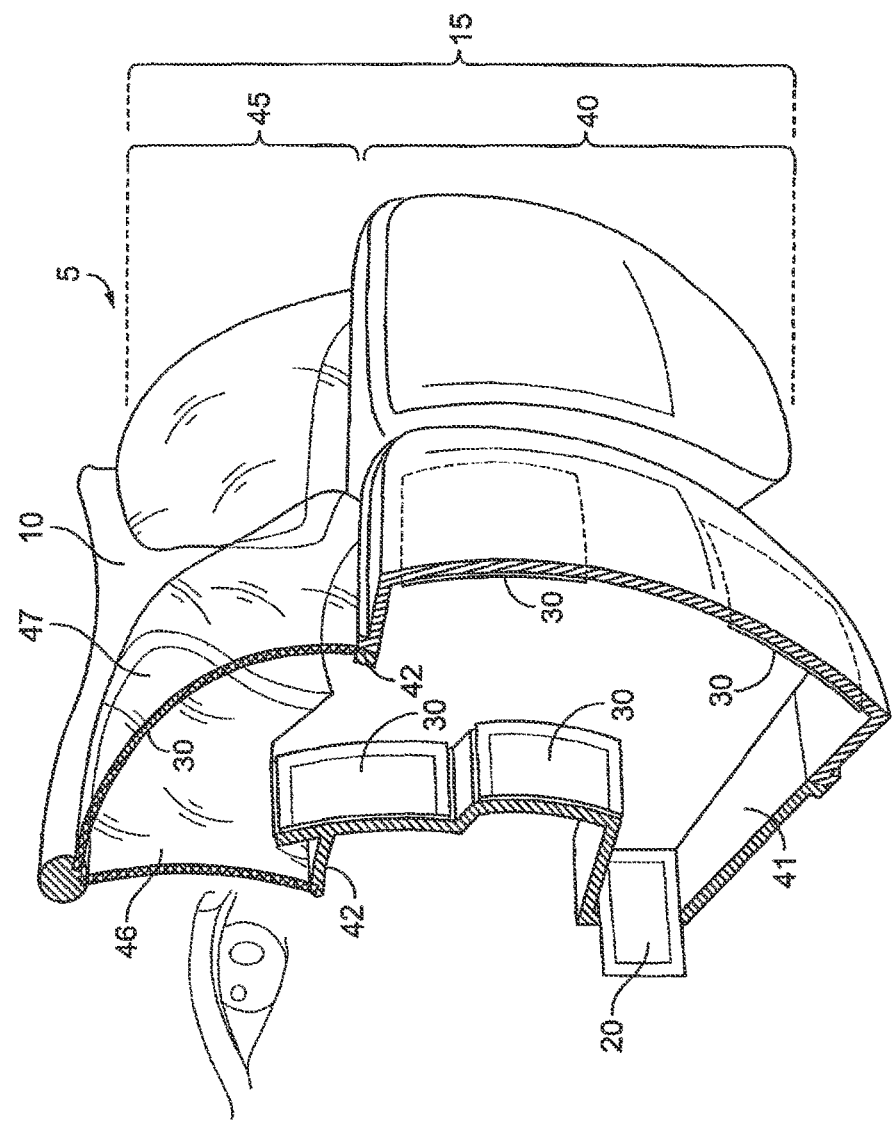
FIG. 3 is a perspective section-view of a bi-ocular embodiment of the primarily reflective-based head mounted display device that utilizes five reflective optical surfaces.

Referring to FIGS. 3 and 5, each near-to-eye optics housing 15 includes a light-emitting visual source 20 for projecting visual content, a plurality of reflective optical surfaces 30, a primary transmission housing 40, and a secondary vision housing 45.

The light-emitting visual source 20 is an electronic device that presents information in visual form that is capable of being viewed by an observer. In a one embodiment, the light-emitting visual source 20 is a micro-display connected to a power source, wherein the micro-display includes a source input for accepting input signals from an external source, which are to be output in visual form. However, the disclosure of the aforementioned embodiment should not be read to limit the type of light-emitting visual source(s) that may be utilized in the practice of the matter disclosed herein. Accordingly, in alternate embodiments, the light-emitting visual source 20 can be a laser writer, micro-projector, or any other device or system that is capable of displaying visual content. Furthermore, the light-emitting visual source 20 may receive the input signals from the external source via conventional wires or cables, fiber optics, wireless signal transmission, or any other similar way of transmitting signals known to those skilled in the art of signal and data transmission.

Visual content to be projected includes both static and dynamic visual content, and any additional content that can be visually displayed and is capable of being viewed. Static visual content includes content that does not change over the time during which it is displayed and includes but is not limited to photos, still imagery, static text and graphic data displays that do not update with new information. Dynamic visual content includes content that does change over the time during which it is displayed and includes but is not limited to video playback or real time video, changing imagery, dynamic text and graphic data displays that update as new information is obtained.

The plurality of reflective optical surfaces 30 are surfaces that have a highly polished or smooth surface finish, such as that of a mirror, polished metal, or smooth glass for example, and use the optical physics principal of reflection in order to cast back light waves that are incident upon them. The plurality of reflective optical surfaces 30 are in optical communication with the light-emitting visual source 20 and are configured to cooperatively reflect a clearly focused projection of the visual content from the light-emitting visual source 20 into the eye of the user.

Figure 3A:
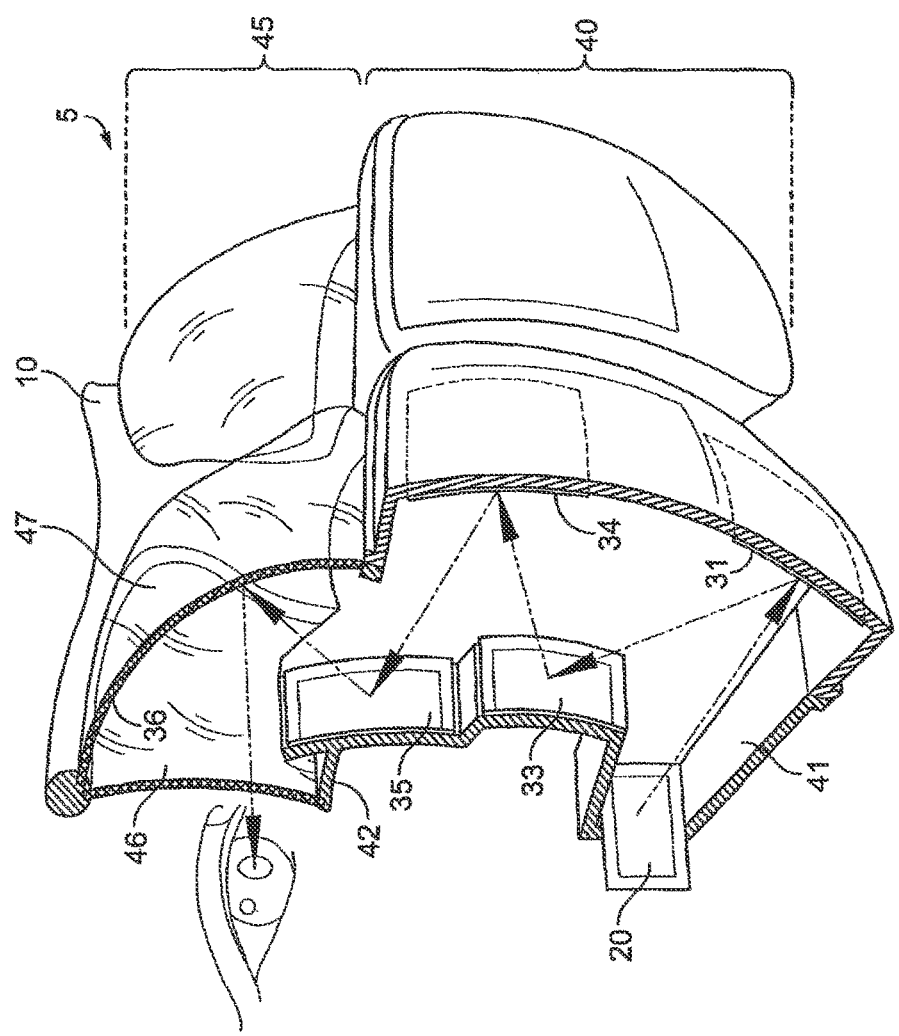
FIG. 3A is a perspective section-view of a bi-ocular embodiment of the primarily reflective-based head mounted display device illustrating an embodiment of the path of reflection from the light-emitting visual source to a user's eye in a five-reflector system.
Figure 6:
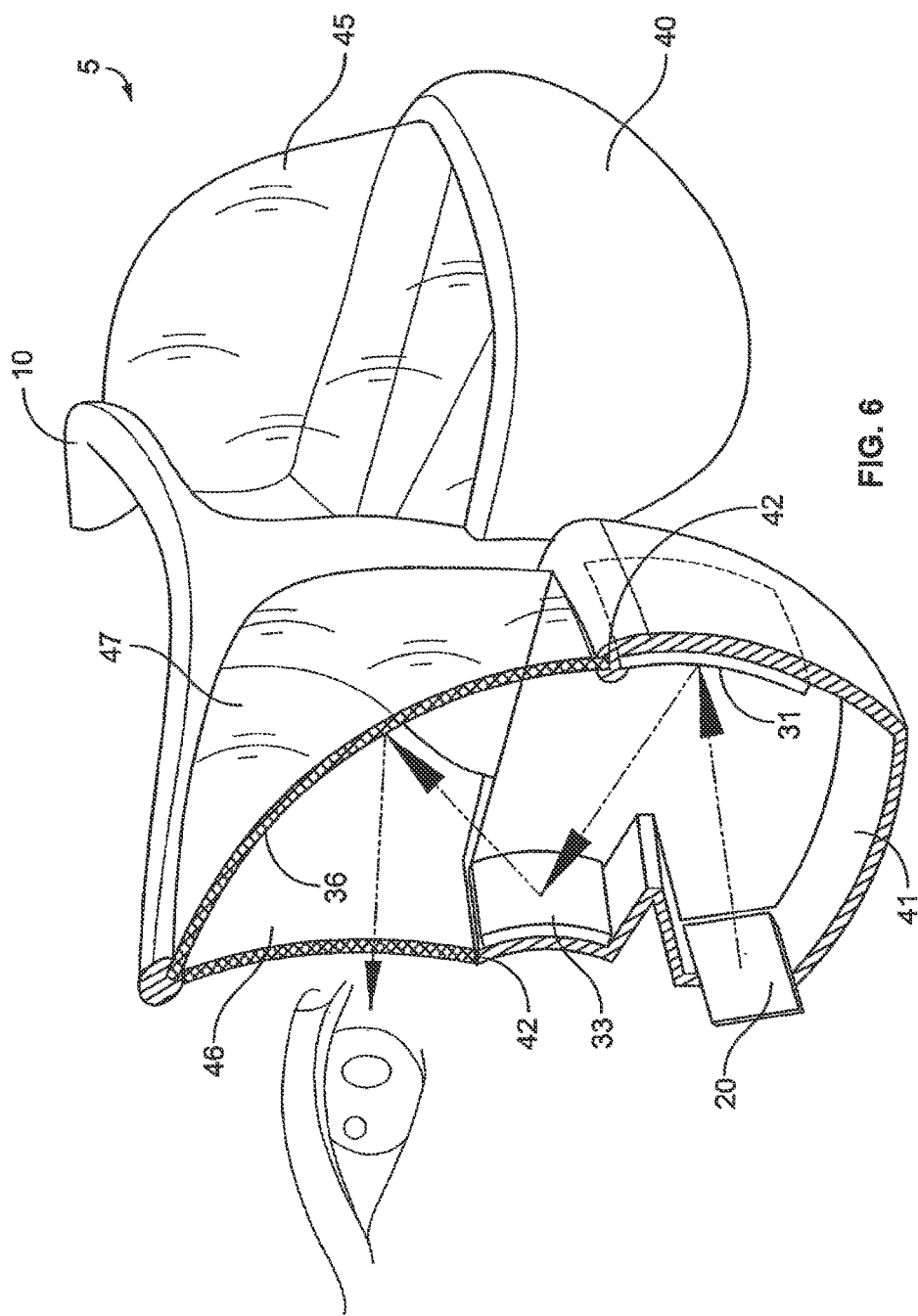
FIG. 6 is a perspective section-view of a bi-ocular embodiment of the primarily reflective-based head mounted display device illustrating an embodiment of the path of light reflection from the light-emitting visual source to a user's eye in a three-reflector system.

Referring to FIGS. 3A and 6, in one embodiment, the plurality of reflective optical surfaces 30 are a combination of separate concave and convex surfaces and include at least a first reflective optical surface 31 and a last reflective optical surface 36. The first reflective optical surface 31 is the reflective optical surface into which the visual content is first projected from the light-emitting visual source 20. The last reflective optical surface 36 is the reflective optical surface from which the visual content is last reflected into the user's eye. In one embodiment, the plurality of reflective optical surfaces 30 also include at least one intermediate reflective optical surface (not shown). These concave and convex reflective optical surfaces 30 are additionally configured to cooperatively magnify the projection of the visual content when the projection is reflected off of each reflective optical surface 30, so that the projected visual content 55 (FIGS. 9A-9C) appears magnified and in focus when viewed by the HMD device user's eye. However, the disclosure of the aforementioned embodiment utilizing a combination of separate concave and convex surfaces should not be read to limit the scope of the shape of reflective optical surfaces that may be used in an HMD device as disclosed herein. In alternate embodiments, the HMD device 5 may utilize solely convex reflective optical surfaces, solely concave reflective optical surfaces, or other unique geometries without departing from the scope of the disclosure herein. Furthermore, although the disclosure of the aforementioned embodiments has thus far been directed to HMD's utilizing only a plurality of reflective optical surfaces 30 to reflect the visual content projected from the visual source 20 to a user's eye, alternate embodiments may include additional optical elements incorporated into the optical path without departing from the scope of the disclosure to a primarily reflective-based HMD. Accordingly, in alternate embodiments, in addition to including a plurality of reflective optical surfaces 30, one or more refractive elements (not depicted) may be located in the optical path between the light-emitting visual source 20 and the user's eye, in order to manipulate the light waves that will pass there through. In this regard, a hybrid reflective/refractive HMD is created.

Figure 4:
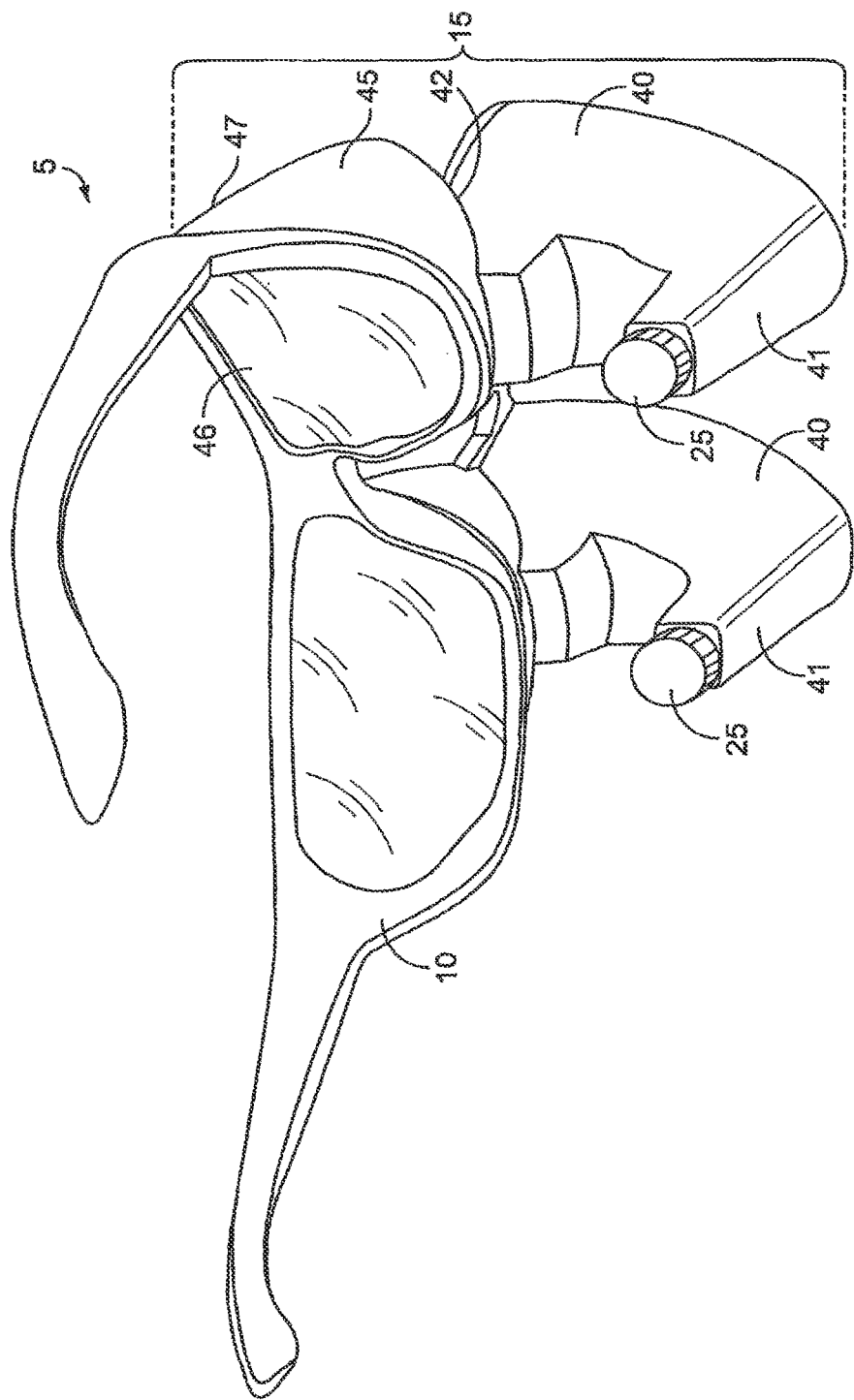
FIG. 4 is a rear perspective view of an embodiment of the primarily reflective-based head mounted display device.

Referring to FIGS. 2 and 4, each near-to-eye optics housing 15 includes, or has connected thereto, a diopter adjuster 25 that is in communication with the light-emitting visual source 20. The diopter adjuster 25 is configured to physically move the position of the light-emitting visual source 20 either forward or backward, in a direction that is substantially parallel to the direction of visual content projection emanating from the light-emitting visual source 20. In doing so, the light-emitting visual source 20 will move either closer to or further away from the fixed location of the first reflective optical surface 31. This results in a corresponding adjustment to the final focal point of the projected visual content within the user's eye. Accordingly, the diopter adjuster 25 is able to provide prescription focus correction and adjust the focus of the visual content that is projected to the user's eye over a fixed prescription range.

Referring again to FIGS. 1 through 6, the primary transmission housing 40 is a chamber of the near-to-eye optics housing 15 in the HMD device 5 in which the projection of the visual content from the light-emitting visual source 20 originates, and in which the majority of the optical reflection and magnification of the projected visual content occurs. In one embodiment, the primary transmission housing 40 is a substantially opaque, hollow chamber that has the light-emitting visual source 20 and diopter adjuster 25 disposed at a first end 41 thereof. The primary transmission housing 40 may further contain each of the plurality of reflective optical surfaces 30 except for the last reflective optical surface 36, disposed at various positions inside of the primary transmission housing 40. More specifically, the plurality of reflective optical surfaces 30 are disposed, in part, either directly on the front and rear internal walls of the primary transmission housing 40, or on support structures located on the front and rear interior walls of the primary transmission housing 40. In one embodiment, the primary transmission housing 40 is connected to and supported by the frame 10. However, the disclosure of the aforementioned embodiment should not be read to limit the structure of the primary transmission housing 40 to only being a substantially opaque or hollow chamber. In alternate embodiments, the primary transmission housing may be an open sided structure or an open skeletal framework that simply serves to support the reflective optical surfaces 30, the light-emitting visual source 20, and diopter adjuster 25 in their appropriate locations, but that does not prevent outside incident light from entering into the reflective path of the reflective optical surfaces 30.

The primary transmission housing 40 is comprised of at least one durable, lightweight material such as a magnesium alloy, aluminum alloy, titanium, or any other similar lightweight metal based material that has the physical properties of being very lightweight yet very durable. However, the disclosure of the aforementioned materials should not be read to limit the lightweight materials to only metal-based materials. Accordingly, in alternate embodiments the primary transmission housing 40 may be comprised of a durable lightweight material such as polycarbonate, PVC, polyethylene, nylon, or any other polymer based material that has the physical properties of being very lightweight yet very durable. Furthermore, with regard to the position of the primary transmission housing, in one embodiment, the primary transmission housing is configured to be substantially located below the frame 10 and the user's eye, and adjacent to the user's face. However, in alternate embodiments, the primary transmission housing 40 may be configured to be substantially located along the length of any earpiece associated with the frame 10, adjacent to a side of the user's face, above the frame 10, above the user's eye, adjacent to the user's forehead, or at any other location as needed that allows the HMD device disclosed herein to function according to the teachings disclosed herein.

Referring to FIGS. 2-4 and 6, the secondary vision housing 45 is connected to the primary transmission housing 40 at a second, open end 42 of the primary transmission housing 40, opposite the first end 41 in which the light-emitting visual source 20 is located. The secondary vision housing 45 is the portion of the optics housing 15 that is placed at least partially in front of the HMD device user's eye. In one embodiment the secondary vision housing 45 is also integrally connected to the both the frame 10 and the primary transmission housing 40. However, the disclosure of the aforementioned embodiment should not be read to limit the secondary vision housing 45 to being integrally connected to either the frame 10 or the primary transmission housing 40. In an alternate embodiment, the secondary vision housing 45 can be detachably or hingeably connected to and supported by the primary transmission housing 40.

Referring to FIGS. 3-4 and 6, the secondary vision housing 45 includes a transparent front dust cover 46 that is configured to be positioned directly in front of the user's eye and in the user's line of sight. In one embodiment, the front dust cover 46 is optically neutral, in that it does not act like a traditional prescription lens. Rather, the front dust cover 46 allows light waves from any visual object being viewed by the user to pass through it without any noticeable distortion, alteration, or bending thereof. Furthermore, in one embodiment the front dust cover 46 is comprises a durable transparent material such as polycarbonate, glass, acrylic, or any other similar material that is both transparent and durable.

The secondary vision housing 45 also includes an outer dust cover 47, which is substantially a shell located adjacent to the front dust cover 46. The outer dust cover 47 is configured to be positioned in front of the front dust cover 46 and positioned in the user's same line of sight as the front dust cover 46. Together, the front dust cover 46 and outer dust cover 47 of the secondary vision housing 45 serve to close off the open, second end 42 of the primary transmission housing 40, and thus substantially seal the optics housing 15 so as to prevent dust or any other environmental contaminants from entering the optics housing 15 and interfering with the reflective optics.

Figure 9A:
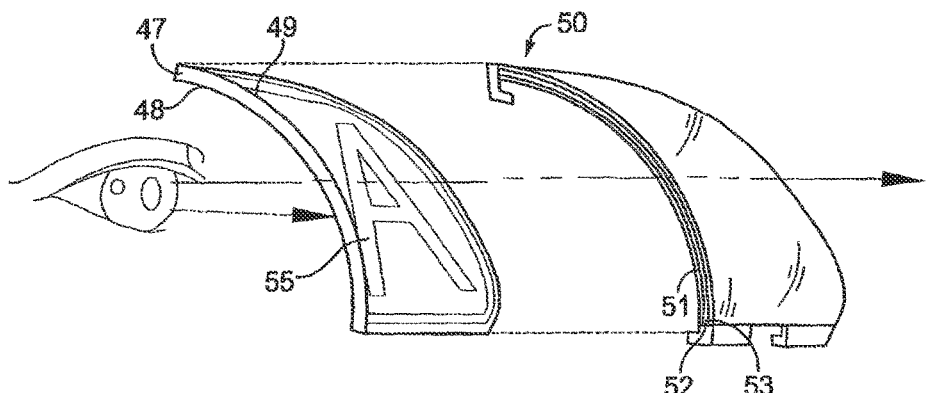
FIGS. 9A-9C are a progression of a perspective exploded views of an embodiment of the last reflective optical surface in communication with an embodiment of an adjustable transmission-loss layer, wherein the adjustable transmission-loss layer has increasing darkness or opacity levels in each of FIGS. 9A through 9C.
Figure 9B:
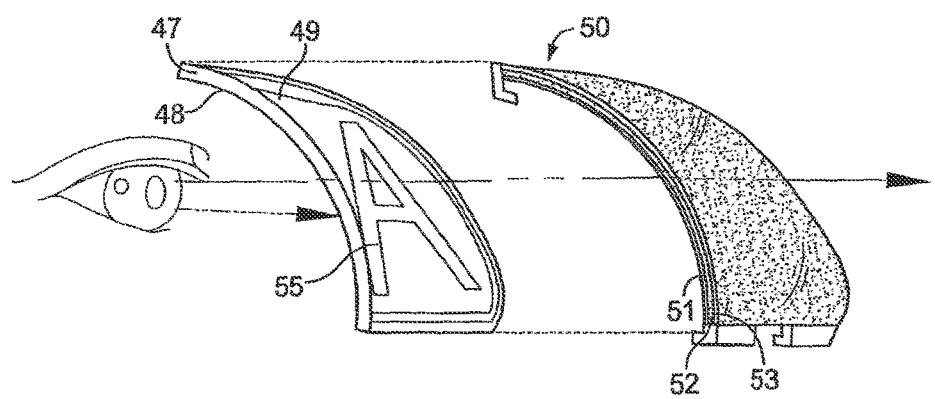
Figure 9C:
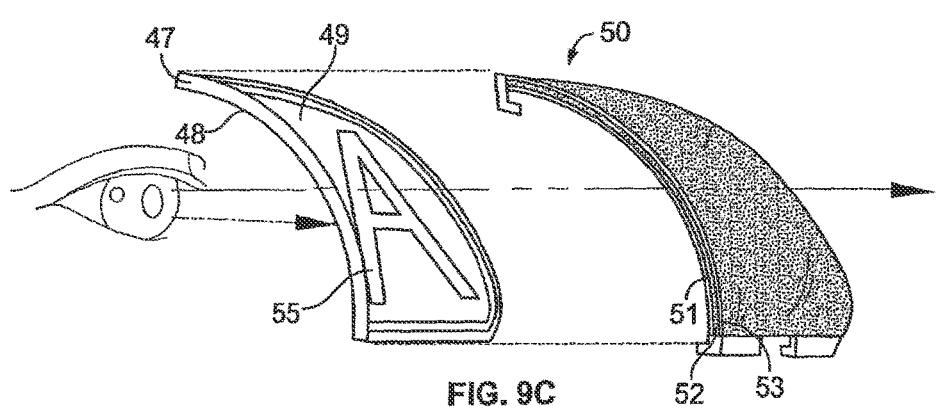

Referring to FIGS. 9A-9C, the outer dust cover 47 includes a concave, interior surface 48 that is configured to be the last reflective optical surface 36 among the plurality of reflective optical surfaces 30. As previously disclosed, this interior surface 48 is the reflective optical surface 36 from which the projected visual content 55 is last reflected into the user's eye. In one embodiment the outer dust cover 47 is a substantially transparent, curved shell that is in communication with a variably-adjustable transmission-loss layer 50. In this embodiment, the outer dust cover 47 is comprised of a durable transparent material such as polycarbonate, glass, acrylic, or any other similar material that is both transparent and durable. Furthermore, the outer dust cover 47 may optionally be designed to have a material thickness sufficient to achieve at least the minimum requirements for providing ballistic protection in optical devices. However, the disclosure of the aforementioned embodiment should not be read to limit the outer dust cover 47 to being only a basic transparent or substantially transparent passive shell. In alternate embodiments (not shown), the outer dust cover 47 may be a switchable mirror or a reversible electrochromic mirror or any other similar such technology that allows for selective mirroring or adjusting of the reflectance of the outer dust cover 47.

In an additional alternate embodiment, the substantially transparent outer dust cover 47 may also be a "partial mirror," in that the otherwise transparent outer dust cover 47 has a partially mirrored interior surface 48, and thus a partially mirrored last reflective optical surface 36. This partially mirrored interior surface 48 has a fixed minimum reflectance value associated therewith. The reflectance value is a ratio, expressed as a percentage, of the total amount of radiation, as of light, reflected by a surface, to the total amount of radiation initially incident on the surface. Having a partial mirror as the interior surface 48 of the outer dust cover 47, and thus the last reflective optical surface 36, allows the HMD designer to increase the minimum reflectance value of the reflective optical surface above that which would otherwise be achievable with the use of only an untreated, transparent outer dust cover 47. In such an embodiment, a partial mirror may be created by having the interior surface 48 of the otherwise transparent outer dust cover 47, as disclosed above, treated or coated with a thin deposit of a reflective material (i.e., aluminum, silver, gold, etc.) in order to enhance the interior surface's 48 reflectance and create a minimum fixed reflectance value for the last reflective optical surface 36. By selecting the proper type and thickness of the reflective material that is to be deposited on the last reflective optical surface 36, a partial mirror having the desired minimum reflectance value may be accurately achieved. In one embodiment, a partial mirror may have a minimum reflectance in a range of about 1-10%, 11-20%, 21-30%, 31-40%, 41-50%, 51-60%, 61-70%, 71-80%, 81-90%, or 91-99%.

Because the substantially transparent outer dust cover 47 of one embodiment is a curved shell having a concave interior surface 48, the outer dust cover 47 acts as a refractive lens that distorts the user's view of the surrounding environment when viewed there through. Accordingly, an exterior surface 49 of the outer dust cover 47 has a separate corrective refractive lens shape (not shown) formed thereon that counteracts this distortion to result in an outer dust cover 47 that is optically neutral with no noticeable distortional effects occurring to the light waves that pass there through.

Referring again to FIGS. 9A to 9C, in one embodiment, the variably-adjustable transmission-loss layer 50 in communication with the outer dust cover 47 can selectably be made to have varying levels of darkness or opacity, ranging from completely dark or fully opaque to fully transparent. In one embodiment, the adjustable transmission-loss layer 50 may comprise at least three distinct layers 51, 52, 53, wherein a flexible and adjustable liquid crystal layer 52 is laminated or located between two protective layers 51, 53 (see FIGS. 9A to 9C). This sandwich of three layers can be removably attached to either the exterior surface 49 or interior surface 48 of the outer dust cover 47 and the darkness of liquid crystal layer may be adjusted to allow for various levels of transmission-loss of the light that passes there through.

However, the disclosure of the aforementioned embodiment should not be read to limit the adjustable transmission-loss layer 50 to being a separate removable layer that can be attached to the outer dust cover 47. In alternate embodiments, the adjustable transmission-loss layer 50 may be integrally associated with the outer dust cover 47. In such an embodiment, the outer dust cover 47 may comprise at least two separate layers, wherein the adjustable transmission-loss layer 50 is a flexible and adjustable liquid crystal layer that is laminated or located between two of the layers of the outer dust cover 47. In yet another alternate embodiment, the adjustable transmission-loss layer 50 may be integrally associated with the exterior surface 49 or interior surface 48 of the outer dust cover 47. Additionally, the disclosure of the aforementioned embodiments should not be read to limit the adjustable transmission-loss layer 50 to only using liquid crystal technology. In alternate embodiments the adjustable transmission-loss layer 50 may utilize any type of technology or be any type of layer that is capable of attaining adjustable levels of transmission-loss, such as switchable mirrors or reversible electrochromic mirrors.

In addition, because the front dust cover 46 and outer dust cover 47 of one embodiment are substantially transparent, the user has the ability to see through both the front dust cover 46 and the outer dust cover 47, so as to view both the user's real-world surrounding environment and, at the same time, view the projected visual content 55 overlaid onto the user's view of the real-world surrounding environment. This provides the user with "see-through vision" in which the user simultaneously sees a mixed-reality view of both the visual content 55 and the surrounding environment. If the user wants a brighter view of the projected visual content 55, he can increase the level of darkness or opacity associated with the adjustable transmission-loss layer 50 further towards the dark or opaque end of the scale, which in turn will increase the transmission-loss of outside light passing through the layer to the user's eyes, and darken the view of the surrounding environment that the user is able to see. If the user makes the adjustable transmission-loss layer 50 completely dark or opaque, he will only be able to see the projected visual content 55, and the outside environment will be completely blocked out. If, however, the user adjusts the adjustable transmission-loss layer 50 to be fully transparent, the user will still be able to see a faint projection of the visual content 55 while having a bright view of the surrounding environment. In one embodiment in which the outer dust cover 47 is an untreated, transparent outer dust cover and the adjustable transmission-loss layer 50 is adjusted to be fully transparent, the user will view the surrounding environment at full brightness. However, in embodiments in which the outer dust cover 47 is a partial mirror, the surrounding environment will appear slightly darker than it is in reality due to transmission-loss from the partial mirror preventing all of the light from the surrounding environment from passing through the outer dust cover 47 to the user's eye. One additional way to adjust the brightness of the projected visual content 55 as seen by the user is to either brighten or dim the output of light-emitting visual source 20.

In an alternate embodiment, the adjustable transmission-loss layer 50 could simply be removed altogether and replaced with a set of darkened filters having a fixed level of transmission-loss, similar to sunglasses, that are attached to the exterior surface of the outer dust cover 49. These filters would allow only a fixed percentage of incident light to pass there through. In yet another alternate embodiment, there may be no adjustable transmission-loss layer 50 at all and the outer dustcover 47 itself may be a substantially transparent set of darkened filters. In this embodiment, the brightness of both the projected visual content 55 and the surrounding environment in the mixed-reality view may be determined primarily by the color and/or shade of the transparent material from which the transparent outer dust cover 47 is made. If, for example, the transparent outer dust cover were charcoal in color, then this would result in some transmission-loss of outside light passing through the outer dust cover 47. In this case the projected visual content would appear brighter while the view of the surrounding environment would appear darker than if the outer dust cover 47 were a colorless transparent material.

Furthermore, in any of the aforementioned embodiments in which the front dust cover 46 and outer dust cover 47 are both transparent or allow a user to view the real-world surrounding environment, the secondary vision housing 45 may be configured to allow a prescription lens (not shown) to be attached thereto for providing a user with prescription focus correction if needed to clearly view the surrounding environment there through. In an alternate embodiment, the front dust cover 46 of the secondary vision housing 45 may be a permanent prescription lens, specific to the prescription focus correction needs of the user, for when the user is viewing the surrounding environment there through.

In yet another alternate embodiment, the outer dust cover 47 can be a permanent and substantially opaque shell preventing the user from seeing the surrounding environment there through. In this manner the user can only view the reflection of the projected visual content that is reflected off of the interior surface 48 of the outer dust cover 47, which is also the last reflective optical surface 36. Furthermore, in this alternate embodiment, no corrective lens shape need be formed in the exterior surface 49 of the outer dust cover 47, because it is not possible to see through the outer dust cover 47.

Referring to FIG. 3A, as previously disclosed, the HMD device 5 includes a first 31 and a last 36 reflective optical surface, and in one embodiment includes at least one intermediate reflective optical surface (not shown). In one embodiment, the HMD device 5 is a device that has a total of five reflective optical surfaces, with the at least one intermediate reflective optical surface 32 comprising a second 33, a third 34, and a fourth 35 reflective optical surface. In this embodiment, the first 31 and third 34 reflective optical surfaces are concave surfaces, the second 33 and fourth 35 reflective optical surfaces are convex surfaces, and each of the first 31, second 33, third 34, and fourth 35 reflective optical surfaces are substantially fully mirrored surfaces located within the primary transmission housing 40. Furthermore, as previously disclosed in one embodiment, the last reflective optical surface 36 is the concave transparent interior surface 48 of the outer dust cover 47, which is comprised of a transparent material, such as polycarbonate. However, the disclosure of the aforementioned five reflector HMD device should not be read to limit the scope of HMD devices to only those HMD devices utilizing five reflective optical surfaces. Accordingly, alternate embodiments may exist that utilize fewer than, or more than, five reflective optical surfaces and that continue to fall within the scope of the present disclosure.

Referring to FIGS. 5 and 6, in an alternate embodiment, the HMD device 5 may be a device that has a total of three reflective optical surfaces 30, with the at least one intermediate reflective optical surface 32 comprising a second 33 reflective optical surface. In this alternate embodiment, the first reflective optical surface 31 is a concave surface, the second reflective optical surface 33 is a convex surface, and both of the first 31 and second 33 reflective optical surfaces are substantially fully mirrored surfaces located within the primary transmission housing 40. Additionally, the last reflective optical surface 36 is the concave, transparent interior surface of the outer dust cover 47, which is comprised of a transparent material, such as polycarbonate.

Determining the Geometry of the Reflective Optical Surfaces

In one embodiment, the geometric shapes of each of the reflective optical surfaces are determined by utilizing a high end optical design software, such as CODE-V written by Optical Research Associates, ZEMAX written by ZEMAX Development Corporation, or OSLO written by Sinclair Optics, Inc. in order to define the shapes of the reflective optical surfaces based on a large list of independent design input variables chosen by, and having input values set by, a HMD system developer. Each of these aforementioned example high end optical design software packages should be familiar to one skilled in the art of optical system design.

The shape of each mirror and the associated algorithms that define the shape of each mirror are output by the software and are determined based on a significant number of input variables that are chosen by, and have their values set by, the system developer. These variables are specific design parameters that are chosen based on the desired overall system or the specific design requirements. In one embodiment, the operator of the software independently selects the design input variables and their associated values and input them into the optical design software prior to running a computer analysis that will output the geometric shapes and the associated algorithms that define those shapes. Among the lengthy list of design variables whose values are to be determined and input into the software, prior to running any computer analysis, are the following: the desired number of separate reflective optical surfaces and/or refractive elements in the overall primarily reflective-based system; whether each reflective optical surface is to be concave, convex, flat, some unique alternate geometry, or a combination thereof; the desired range of eye-relief related to the last reflective optical surface; the desired dimensions of the eyebox; the desired FOV angle for the overall reflective system; the amount of acceptable or desired visual content distortion, such as pincushion or barrel distortion, that may be observed by the HMD device user; the desired dimensions of the overall system package (i.e., the package envelope); the desired exiting angle of vision; whether mixed-reality viewing is desired; the manner in which the projected light waves will enter the system from the visual source 20 and the desired manner in which they should exit the system from the last optical surface 36; and whether you want the overall system to be an above-eye, below-eye, or to the side of the eye system. This list is by no means an exhaustive list of variables and has been provided as an exemplification of possible system design choice input variables. Other design variables exist that will affect the output of the software analysis and any resulting mathematical algorithms that define the shape of each reflective optical surface. The variables that are input into the software depend on the desired overall system or the specific design requirements of the HMD device.

The following descriptions are provided in order to further clarify and define the aforementioned design variables referenced above. The eye relief is the distance from the pupil of the user's eye to the center point of the last reflective optical surface. The eyebox is the virtual area through which the near parallel light bundle coming from the last reflective optical surface may enter the user's eye. The eye box is often a circular area defined by a diameter that is at least as large as, if not significantly larger than, the pupil of the user's eye. For example, if in an average lighting situation the typical user has a pupil that is 2 millimeters in diameter, it may be desirable to choose an eyebox dimension that is 10 millimeters in diameter. This would allow the user to move the pupil of his eye within the eyebox in an upward, downward, left, or right direction and not lose sight of the visual content that is reflected off of the last reflective optical surface and that is passing through the larger 10 mm eyebox. The FOV, as discussed previously, refers to the swept angular extent (often a diagonal angle) to which a user can see observable content reflected from the last reflective optical surface. The dimension of the overall system package, or the "package envelope," refers to the outer dimensions of the overall HMD device, including all optics housings. Lastly, the exiting angle of vision refers to, in a mixed-reality view, the overall allowable angle of vision in which the user can view the outside world through the HMD device while wearing the HMD device.

Once the variables are chosen and their desired values have been determined by the system designer, the designer then initiates the analytical portion of the optical design software to run a computer design analysis in order to determine the overall geometric shape of each reflective optical surface and their associated locations relative to each other and relative to the user's eye. When the analysis is completed, the software outputs a complex algorithm that defines the shape of each geometric surface. If even a single one of the significant number of input variables is changed or altered even slightly, the geometric shape of each reflective optical surface, their relative positions, and the resulting mathematical algorithms that define the geometric surfaces will change completely. Accordingly, there is only one specific generic formula used to define the geometry of each surface, which is based on the specific values of the chosen set of input variables. Therefore, with so many options of input variables and corresponding values of those variables, there are quite literally an infinite number of possible reflective optical surface geometries and associated algorithms to define those geometries, all based on the specific combination of independent input variables that are chosen and their selected values.

Operation of the HMD Device

Referring to FIG. 1, in operation, one embodiment of the five-reflector HMD device 5 works as follows. An HMD device user places the frame 10 and the attached optics housings 15 of the HMD device 5 onto his head as he would a pair of eyeglasses. The optics housings 15 are positioned such that the secondary vision housings 45 are located in front of the user's eyes with the front dust cover 46 and the outer dust cover 47 being located in the user's direct line of sight. The user first sees through the transparent front dust cover 46 and then through the transparent outer dust cover 47 to view his surrounding environment. If the user does not naturally have at least 20/20 vision, and generally uses some type of prescription lens correction to achieve 20/20 vision, then a prescription lens may be attached to the secondary vision housing's 45 front dust cover 46 between the user's eye and the front dust cover 46.

Figure 7:
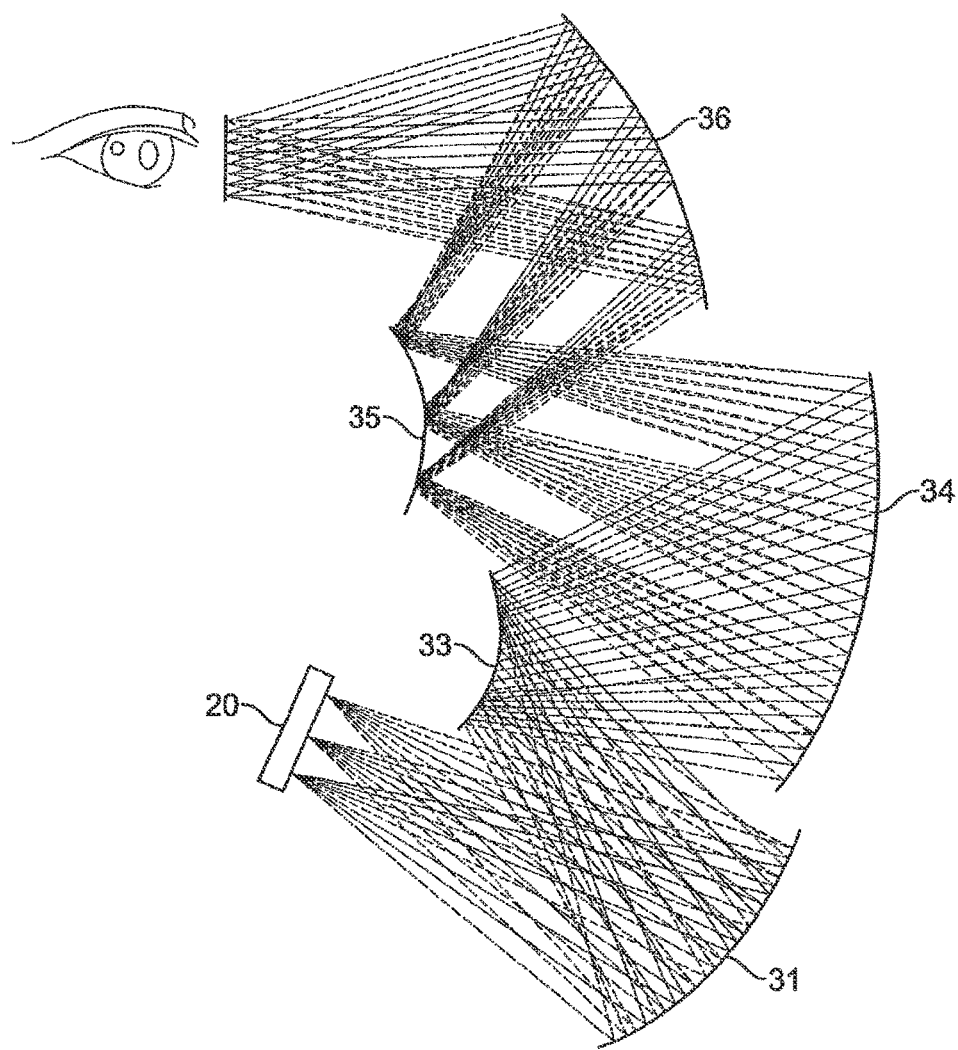
FIG. 7 is a side schematic view of an embodiment of the reflective optical surfaces in a five-reflector head mounted display device illustrating an embodiment of the path of light reflection from the light-emitting visual source to a user's eye.
Figure 8:
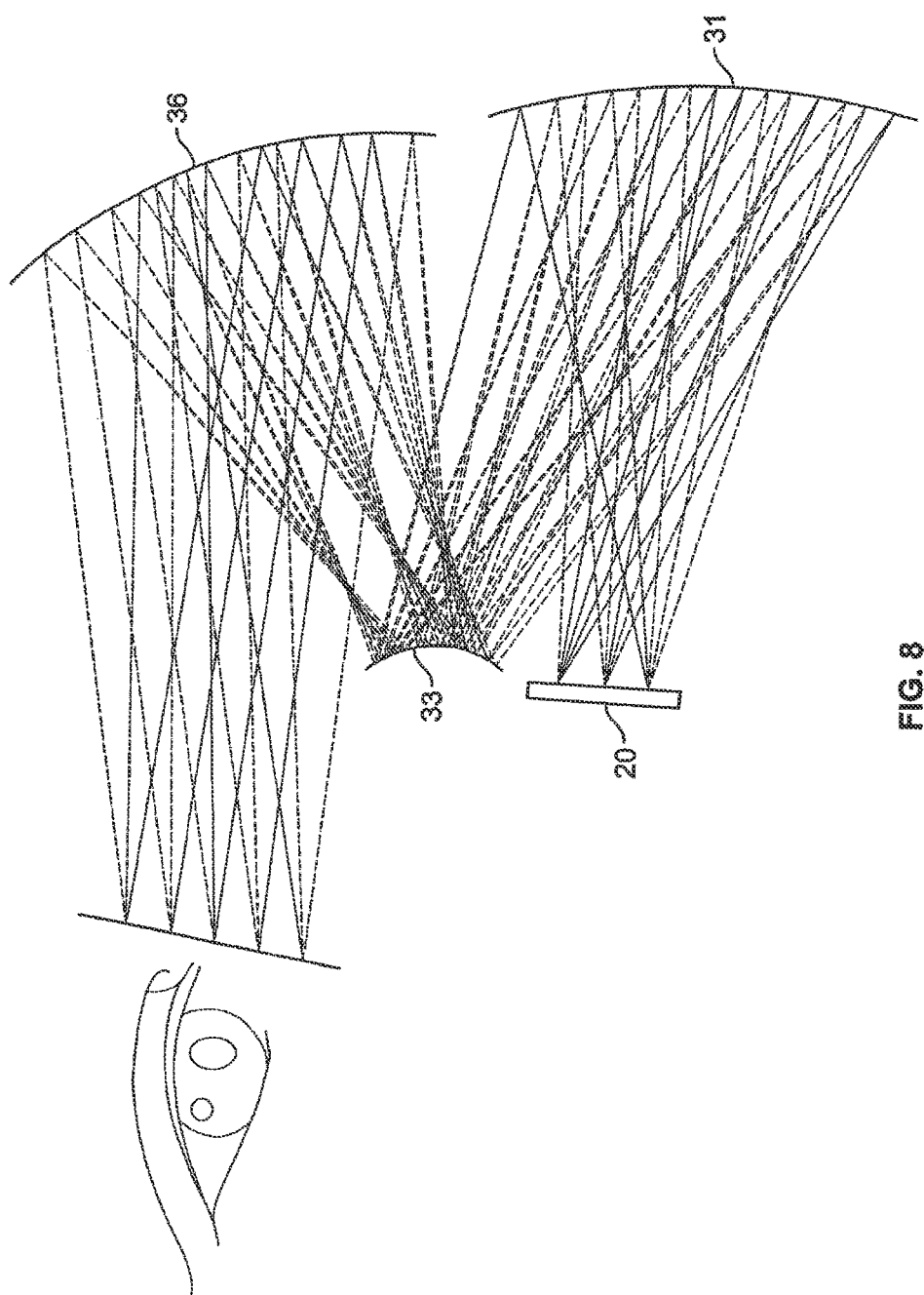
FIG. 8 is a side schematic view of an embodiment of the reflective optical surfaces in a three-reflector head mounted display device illustrating an embodiment of the path of light reflection from the light-emitting visual source to a user's eye.

Power is supplied to both the light-emitting visual source 20 as well as the variable translucent layer 50 that is in communication with the outer dust cover 47. A visual input signal is sent to the source input of the light-emitting visual source 20. The light-emitting visual source 20 accepts the visual input signal and converts it into visual content to be projected. Referring to FIGS. 3A and 7 for the five-reflector HMD device (see FIGS. 6 and 8 for the three-reflector HMD device), the visual content displayed on the light-emitting visual source 20 is projected there from to the concave, first reflective optical surface 31. The concave, first reflective optical surface 31 then reflects the projected visual content to the convex, second reflective optical surface 33. The convex, second reflective optical surface 33 then reflects the projected visual content to the concave, third reflective optical surface 34. The concave, third reflective optical surface 34 then reflects the projected visual content to the convex, fourth reflective optical surface 35. Each of the first 31, second 33, third 34, and fourth reflective optical surfaces 35 are substantially fully mirrored surfaces. The convex fourth reflective optical surface 35 then reflects the projected visual content to the concave, last reflective optical surface 36, which, in one embodiment, is also the interior surface 48 of the transparent outer dust cover 47. The interior surface 48 of the transparent outer dust cover 47, and accordingly the last reflective optical surface 36, may be a partial mirror as previously described. The concave last reflective optical surface 36 then reflects the projected visual content through the front dust cover 46, as well as through any prescription lens attached thereto, and into a user's eye, or more specifically, to a virtual eyebox, where the visual content appears magnified and in focus.

However, the disclosure of the operation of this embodiment should not be read to limit the order in which the projected visual content is reflected from each of the plurality of reflective optical surfaces 30. In other words, the order in which the visual content is reflected from the reflective surfaces is not limited to only reflections occurring in a sequentially numbered order, with each reflective surface only being utilized for one reflection of the visual content.

For example, in a system that would otherwise utilize seven reflective optical surfaces to achieve a specific desired magnification and FOV angle (i.e., the sequential order of reflection of the visual content is: Reflector #1, Reflector #2, Reflector #3, Reflector #4, Reflector #5, Reflector #6, Reflector #7), the same magnification and FOV may be able to be achieved with only five reflective optical surfaces, by utilizing one of the five reflective optical surface to perform the reflections of what otherwise would be achieved with three separate reflective optical surfaces (i.e., the order of reflection of the projected visual content could be: Reflector #1, Reflector #2, Reflector #3, Reflector #1, Reflector #4, Reflector #5, Reflector #1).

Continuing on with the disclosure of the operation of one embodiment, if the visual content projected to the user's eye is not immediately seen by the user as being bright enough or clear and in focus, there are several adjustments the user can make to the HMD device 5 to improve or optimize the user's see-through vision and achieve a more balanced mixed-reality view. First, referring to FIGS. 9A to 9C, regarding the brightness of the projected visual content, if the user feels that the visual content is not bright enough, the user can make adjustments to the variably-adjustable transmission-loss layer 50 to make the layer 50 darker and more opaque, and in turn increase the transmission-loss of outside light passing there through to make the projection of the visual content appear brighter. However, doing so also decreases the amount of light entering the user's eye from the surrounding environment and thus darkens the user's view of the real-world surrounding environment that is seen through the projected visual content in the mixed-reality view. Conversely, if the user's view of the surrounding environment is too dark to be seen, or if it is simply not at the user's desired brightness level, then the user may adjust the adjustable transmission-loss layer 50 to make the layer 50 appear lighter and more transparent. This will decrease the transmission-loss of outside light passing there through and allow more light from the surrounding environment to pass through the layer 50 to reach the user's eye. This however, has the effect of making the projected visual content appear lighter or less vivid to the user in the mixed-reality view.

Second, referring to FIG. 4, regarding the clarity of the projected visual content seen by the user, if the projected visual content is not clearly in focus, the user may make manual adjustments to the diopter adjuster 25 so as to move the light-emitting visual source 20 closer to or further away from the first reflective optical surface 31 located inside the primary transmission housing 40. This results in a corresponding adjustment to the position of the final focal point of the projected visual content within the user's eye, or within the eyebox, thus allowing the user to clearly focus the visual content.

One of the major benefits associated with a primarily reflective-based HMD device 5, as presently disclosed herein, is that because there is no need for any heavy glass or acrylic refractive lenses and mounting hardware within the device in order to achieve magnification and focus of the projected visual content, the HMD device 5 is extremely lightweight and comfortable for the user to wear, more so than any other available HMD device. Furthermore, because the reflective-optics do not require separate and expensive refractive lenses, the manufacturing cost associated with the HMD device disclosed herein are significantly less than other HMD devices currently available in the consumer, commercial, or military markets. This also translates to a significantly lower purchase price for the final HMD device 5. In addition, the primarily reflective-based HMD device 5 as disclosed herein is capable of achieving large text-readable FOV angles and increasing the FOV angle from one embodiment of the device to another embodiment of the device without adding significant cost or weight to the HMD device 5. Lastly, another benefit associated with the HMD device disclosed herein is that because the optics housings 15 of the primarily reflective-based HMD device 5 are extremely compact, the HMD device 5 is a near-to-eye device.

General Physical Description of an Embodiment of a HMD

A HMD according to one embodiment is an article to be worn by a user and provides a stereo view of an electronically generated image. The image is generally processor generated or computer generated, and may be a still image or a moving animation image. The image may include photographical, graphical, text, or other types of visual subject matter. In some use cases, the image as seen by the user may be shielded from outside light so as to provide the user with a completely immersive experience. In some use cases the image as seen by the user may provide the user with an "augmented" view of reality; that is, the image may be superimposed upon an outside view of the real world around the user.

Figure 10:
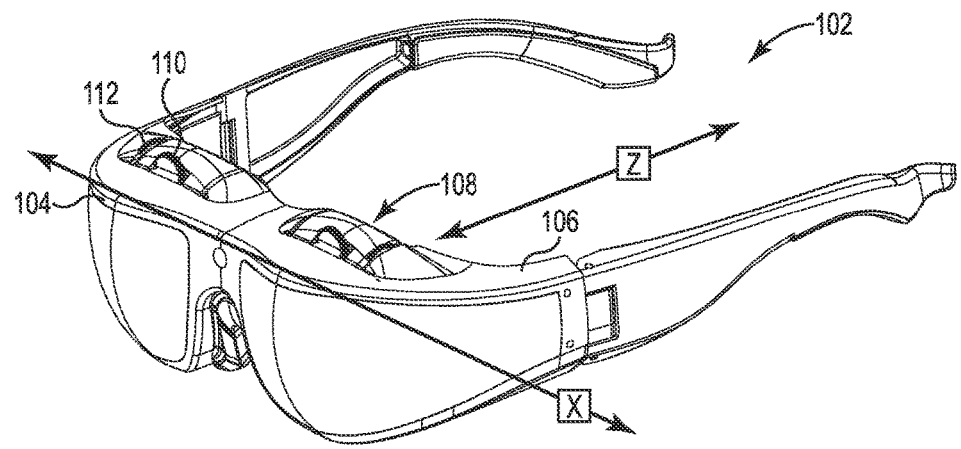
FIG. 10 is a front isometric view of an exemplary head-mounted display according to one embodiment.
Figure 11:
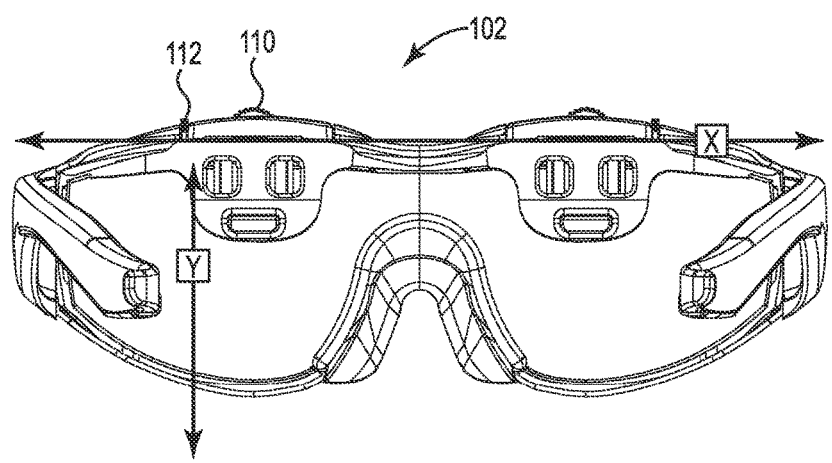
FIG. 11 is a rear view of an exemplary head-mounted display according to one embodiment.
Figure 12:
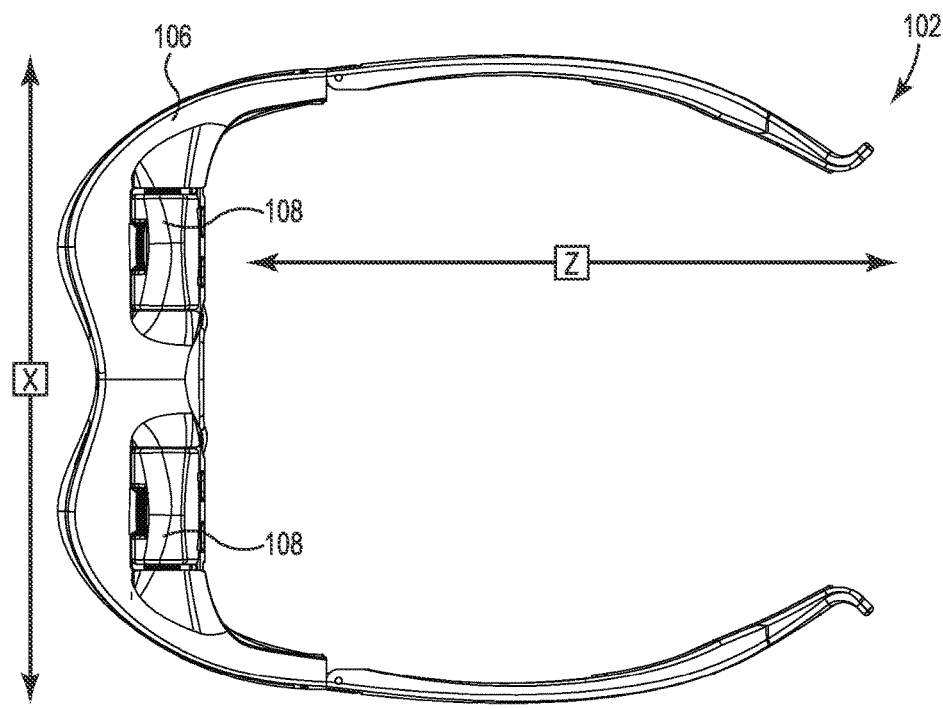
FIG. 12 is a plan or top view of an exemplary head-mounted display according to one embodiment.
Figure 13:
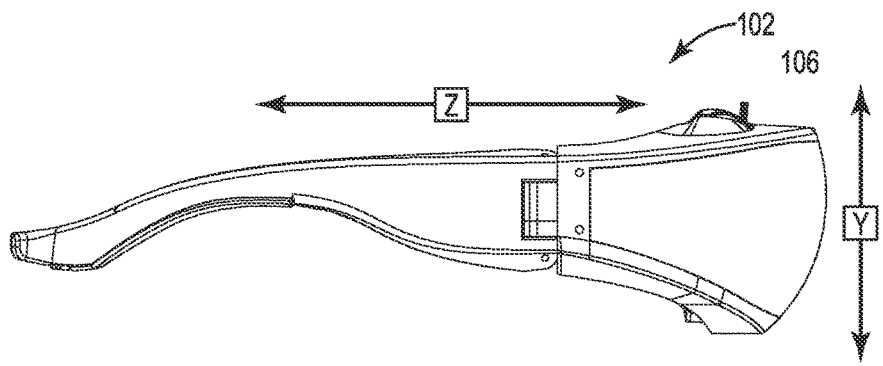
FIG. 13 is a side view of an exemplary head-mounted display according to one embodiment.

An assembled view of an advantageous embodiment of a HMD 102 is depicted in FIGS. 10-13. FIG. 10 generally depicts an isometric frontal view of the HMD 102. FIG. 11 depicts a rear view according to the perspective of a user looking through the HMD 102. FIG. 12 depicts a top view and FIG. 13 depicts a side view of HMD 102.

Directional axes X, Y, and Z are defined in FIGS. 10-13. Generally the X-axis is defined as horizontally left to right according to a user wearing the HMD 102. The X-axis generally follows a top portion 104 of an outer frame 106 of the HMD 102. Construction of the HMD 102 including frame 106 is described in further detail below. The Y-axis is defined as a vertical axis that is approximately aligned with a gravitational reference when the HMD 102 is in use and a user is standing or sitting up. Finally the Z-axis is defined as being approximately aligned with the "line of site" of the user of the HMD 102 when the user is looking forwardly through the HMD 102 in a forward direction. Axes X, Y, and Z are generally mutually orthogonal.

In terms of directions, we refer to left and right along the X-axis as corresponding to the left and right eyes of the user. Upward and downward, with respect to the Y-axis, refers to a gravitational frame of reference when a user is standing erect and wearing HMD 102. Forward with respect to the Z-axis refers to the user's line of sight and away from the user. Rearward with respect to the Z-axis is opposite to the forward direction with respect to Z-axis and toward the user.

Other features depicted in FIGS. 10-13 are two micro-display mechanisms 108 positioned along and below the top portion 104 of outer frame 106. The X-position of each micro-display mechanism 108 is approximately the same as the X-position of each of the user's eyes. Each micro-display mechanism 108 contains a small micro-display mounted in a positioning mechanism for adjusting a position of the micro-display along the X and Z-axes. The positioning mechanism includes an X-axis position adjuster 110 for moving the micro-display along the X-axis, and a Z-axis position adjuster 112 for moving the micro-display along the Z-axis. The micro-display mechanism 108, including component parts, action, and assembly, will be discussed in more detail below.

Optical Path

The optical path of HMD 102 according to one embodiment is principally defined by a micro-display and a series of non-rotationally symmetrical, free-form reflective optics. This means that the optical elements are not rotationally symmetric about an axis that is generally along an optical ray path that passes through the focal point of the light ray bundle. Essentially, the optical elements are non-spherical elements (asphere free forms). The micro-display is very compact, typically ranging from 0.37" (on the diagonal) to 0.97" (on the diagonal). The mirrors, or reflectors or reflective optical surfaces, are generally arranged to reflect light back and forth with respect to an axis, which axis is generally in line with the user's line of sight (e.g., Z-axis). In an exemplary embodiment this technique uses only air as the light transmission medium. Most HMD optical systems utilize a higher refractive index material for their light path. This introduces more weight and cost than using air. Each of the reflectors (e.g., three reflectors in one embodiment) are generally elongated, with a major axis lying along a horizontal axis (e.g., X-axis), and a minor axis lying along a vertical axis (e.g., Y-axis). Each of the reflecting mirrors is freeform, or asymmetrical, with respect to the horizontal X-axis, while being symmetrical with respect to the vertical Y-axis. The reflectors are each either concave or convex. In an exemplary embodiment, HMD 102 includes three reflective or mirrored surfaces referred to as M1, M2, and M3 in the respective order of light being reflected from the micro-display. In the exemplary embodiment, M1 is concave, M2 is convex, and M3 is concave.

In the exemplary embodiment: (1) the micro-display faces generally forward or away from the user with respect to the user's line of sight; (2) the M1 mirror is positioned just below the micro-display with respect to the vertical Y-axis, and has its reflective surface facing generally backwards and toward the user; (3) the M2 mirror is positioned just below the M1 mirror with respect to the vertical Y-axis and has its reflective surface facing generally forward and away from the user; (4) the M3 mirror is positioned just below the M2 mirror with respect to the vertical Y-axis and has its reflective surface facing generally backwards and toward the user.

The optical path passes light and images from the micro-display in a back and forth manner, relative to the user's line of site along the Z-axis, and vertically downward, relative to a gravitational reference and the Y-axis, reflecting the light ray bundle off of each successive mirror, until it reaches the user's eye. The optical path is (1) from the micro-display to M1, (2) from M1 to M2, (3) from M2 to M3, and (4) from M3 to the user's eye.

This method of creating a magnified image incorporates a non-pupil forming system, providing a tele-centric optic path into the pupil. In other words, the light rays entering the user's eye in the presently disclosed system are parallel so that the image is always visible, regardless of the position of a user's pupil. A rather large exit pupil is formed, on the order of 8 mm. These aspects of the HMD 102 afford maximum eye comfort and ease of viewing, with no vignetting. In other words, there is no reduction in the image's brightness or saturation at the periphery compared with the image center. This size of field of view, in this small form-factor has not been possible prior to this optical solution.

Figure 14:
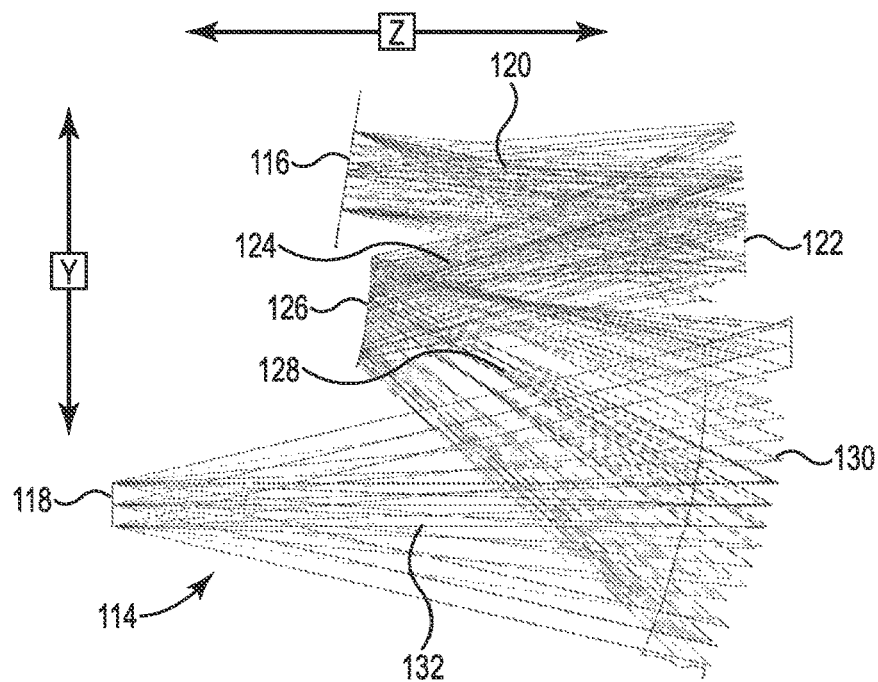
FIG. 14 is a schematic representation of an exemplary ray trace diagram in a head-mounted display according to one embodiment.
Figure 15:
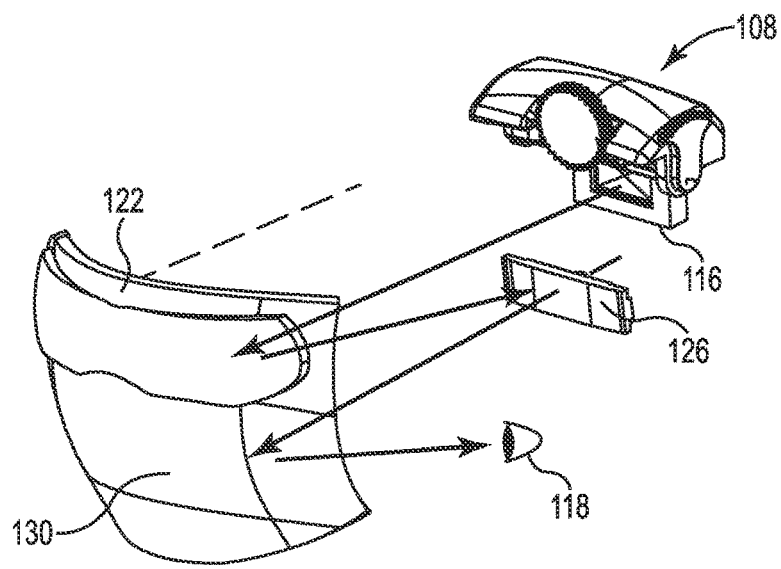
FIG. 15 is a schematic representation of an exemplary optical path utilized in a head-mounted display according to one embodiment.

Illustrations of an optical path 114 defined by optical components of HMD 102 are depicted in FIGS. 14 and 15. The optical path 114 is depicted as being purely reflective between a micro-display 116 and a user's eye 118. Between the micro-display 116 and the user's eye 118 are a series of freeform reflective optics or mirrors. The mirrors are referred to as freeform because they are asymmetrical; that is they are not symmetrical with respect to a central ray path. They are symmetrical with respect to the vertical Y-axis in the exemplary embodiment depicted with respect to FIGS. 14 and 15.

The optical path 114 begins with a rectangular micro-display 116, which is generally a relatively small panel that emits an image. In one embodiment, the micro-display 116 has a diagonal length of between 0.2 inch to 1.0 inch. For an example consumer device, the diagonal length is preferably in the range of 0.3 inch to 0.6 inch. In one embodiment, the consumer version of the micro-display diagonal length is about 0.37 inch. For a military embodiment, the diagonal length is about 0.97 inch.

Examples of image emitting technology for micro-displays 116 include OLED (organic light emitting diode) displays, LCOS (liquid crystal on Silicon) displays, or LCD (liquid crystal display). Referring to FIG. 14, the image from the micro-display 116 passes along a first optical path segment 120 to an M1 mirror 122. The first optical path segment 120 includes light rays that generally diverge between the micro-display 116 and the M1 mirror 122. The rays of the first optical path segment 120 are on average nearly parallel with the Z-axis, but define an acute angle with respect to the Z-axis. The first optical path segment 120 is generally directed forward from the micro display 116 along the Z-axis, and downward along the Y-axis.

The first mirror, M1 122, has an elongated geometry having a major axis disposed along the X-axis and a minor axis disposed along the Y-axis. However, M1 mirror is not planar; rather, it is concave, but its extent generally lies along the X and Y-axes with a small Z-axis component.

The second optical path segment 124 extends between M1 mirror 122 and M2 mirror 126. The second optical path segment 124 is generally directed rearward from M1 mirror 122 with respect to the Z-axis, and downward with respect to the Y-axis. Because M1 mirror 122 is concave, the rays along second optical path segment 124 generally converge.

M2 Mirror 126 is generally convex and has an elongated geometry having a major axis disposed along the X-axis and a minor axis disposed along the Y-axis. The third optical path segment 128 extends between mirror M2 126 and mirror M3 130. The third optical path segment 128 is generally directed forward from M2 mirror 126 along the Z-axis, and downward along the Y-axis. Because the M2 mirror 126 is convex, the rays along the third optical path segment 128 generally diverge.

M3 Mirror 130 is concave and is generally disposed along the X and Y-axes. The fourth optical path segment 132 extends between the M3 mirror 130 and the user's eye 118. The fourth optical path segment 132 is generally directed rearward from the M3 mirror 130 along the Z-axis, and downward along the Y-axis. Because the M3 mirror 130 is concave, the rays along fourth optical path segment 132 generally converge toward the user's eye 118.

The mirrors M1 122, M2 126, and M3 130 are generally disposed primarily along the X and Y-axes. However they may also may have a general tilt with respect with the X-axis in order to define the entire optical path 114. Therefore, to a minor extent, the mirrors lay along the Z-axis as well. Also they are non-planar, and so this description is approximate.

As can be seen, the entire optical path 114, including the first 120, second 124, third 128, and fourth 132 optical path segments, is progressively, or monotonically, directed downward with respect to the Y-axis, while being directed in alternating forward and rearward directions, with respect to the Z-axis, as the light rays travel the path 114 from the micro-display 116 to the user's eye 118. The optical path 114 is alternately divergent and convergent between the micro-display 116 and the user's eye 118. One interesting aspect of this optical path is that it has no stops. That is to say there is no point that the ray bundle converges to a point and flips over. Most optic systems use stops in their optic path. The optical path of HMD 102 according to one embodiment utilizes the user's pupil as the stop of the system. This direct-path optical magnifier produces a non-pupil forming, tele-centric exit pupil ray bundle. This type of optic system produces a natural, relaxed viewing experience.

The optical path depicted in FIGS. 14 and 15 can provide a large field of view (FOV). The FOV can be described in terms of full overlap, partial overlap, or zero overlap. Full overlap is when the right and left images are fully superposed on each other such that they address the same field of view. Zero overlap is when the right and left images cover different fields of view. Partial overlap is when there is a central portion of the image that has an overlapping field of view with portions unique to the left and right eyes.

The optical path described with respect to FIGS. 14 and 15 enables a full overlap FOV to be more than 40 degrees, more than 50 degrees, up to 60 degrees or more than 60 degrees. The optical path described with respect to FIGS. 14 and 15 enables a zero overlap FOV to be more than 80 degrees, more than 100 degrees, up to 120 degree, or more than 120 degrees. Partial FOV values enabled would be an interpolation of the full overlap FOV and the zero overlap FOV.

Structural Support of Optical Components

Some embodiments utilize a separate optical supporting sub-chassis which resides inside a separate outer non-optically supporting eyeglass frame. The mechanical support for the optical path includes a structural frame that provides multiple functions including supporting all optical components and providing a form factor that is configurable into a light weight set of eye glasses. The structural frame is made of a material that has a low coefficient of thermal expansion and a high elastic modulus. In an exemplary embodiment the sub-chassis is formed of a molded or cast magnesium alloy. In a further exemplary embodiment the alloy is AM60B which is a magnesium alloy composition containing primarily Magnesium but also Aluminum, Manganese, Zinc, and other metals. The ultimate tensile strength of AM60B is 220 MPa. The tensile yield strength of AM60B is 130 MPa. The density of resultant cast material is 1.79 grams per cubic centimeter.

The structural frame including attached optical components is constructed in such a manner as to provide accurate critical datums for receiving the optical elements and facilitating assembly. The structural frame has an upper rim and a lower rim relative to the vertical Y-axis with two openings defined there between, with datums. Formed into the upper rim are two pockets that are roughly aligned with the user's eyes in a horizontal X-axis, which contain additional datums. Each pocket is configured to receive a micro-display mechanism which supports a micro-display, which micro-display mechanism contains its own alignment tabs, which rest in the structural frame datums. Upon installation into a pocket, each micro-display mechanism extends downwardly from the upper rim toward the lower rim. In an exemplary embodiment each pocket extends less than half of the distance from the upper rim toward the lower rim. In an exemplary embodiment each micro-display faces forward relative to a line of site of the user, which is to say away from the user's eye. In an exemplary embodiment each micro-display mechanism provides a mechanism for the user to adjust a focal and lateral position of each micro-display.

At a lower or distal end of the pocket is a mount for an optical element which, in one embodiment, is referred to as M2 mirror 126. The M2 mirror 126 is a convex mirror that faces forward relative to the line of site of the user.

Each of the two openings in the structural frame is configured to receive a compound optical element. The compound optical element is formed of an optically clear, low specific gravity, high tolerance and dimensionally stable material. In an exemplary embodiment the clear material is a polymer from the cyclo olefin polymer (COP) family.

An example material used for the compound optical element and the M2 mirror 126 are ZEONEX F52R. Features to the material are: extremely low birefringence and excellent stability under severe conditions (high temperature and high humidity). The refractive index is 1.535. The Birefringence ratio is 0.5. The glass transition temperature is 156 deg. C.

Each compound optical element defines two optical elements including an M1 reflective optical surface, or mirror 122, and an M3 reflective optical surface, or mirror 130, that are both concave mirrors that face rearward, relative to the user's line of sight, which is to say back toward the user's eyes. These compound optical elements incorporate their own alignment tabs, which correlate to the datums in the optical structural frame, which facilitate optical alignment during assembly.

Thus a single structural frame rigidly supports two micro-display assemblies (one for each of the user's two eyes), two compound optical elements, and two concave mirrors that collectively define an optical path for each eye. The optical path for each eye starts at a micro-display and then traverses (1) forward to an M1 mirror, (2) rearward from the M1 mirror to an M2 mirror, (3) forward from the M2 mirror to an M3 mirror, and (4) backward from the M3 mirror to the eye.

The structural frame therefore functions as both a major structural portion of a pair of glasses and at the same time holds a series of optics in precision alignment. This method provides ease of assembly and very accurate alignment of the optical elements and micro-display holder/mechanism. Unlike prior glasses frames this structural frame has a very high modulus and is dimensionally stable enough to provide precision optical alignments suitable for the optical path of an HMD. The unique geometric arrangement of these features enable a very low profile and compact optical path while enabling the user to adjust for focus and interpupillary distance.

Figure 16:
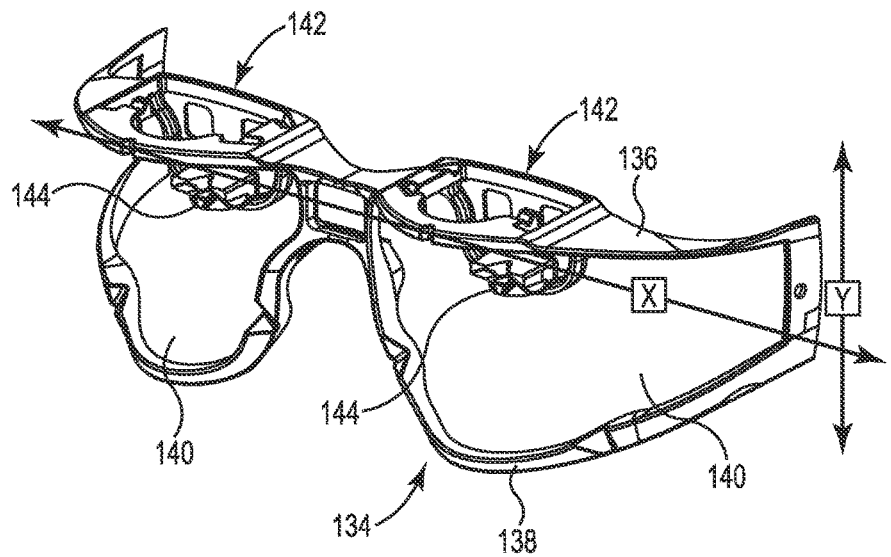
FIG. 16 is a rear isometric view of an exemplary structural frame utilized in a head-mounted display according to one embodiment.
Figure 17:
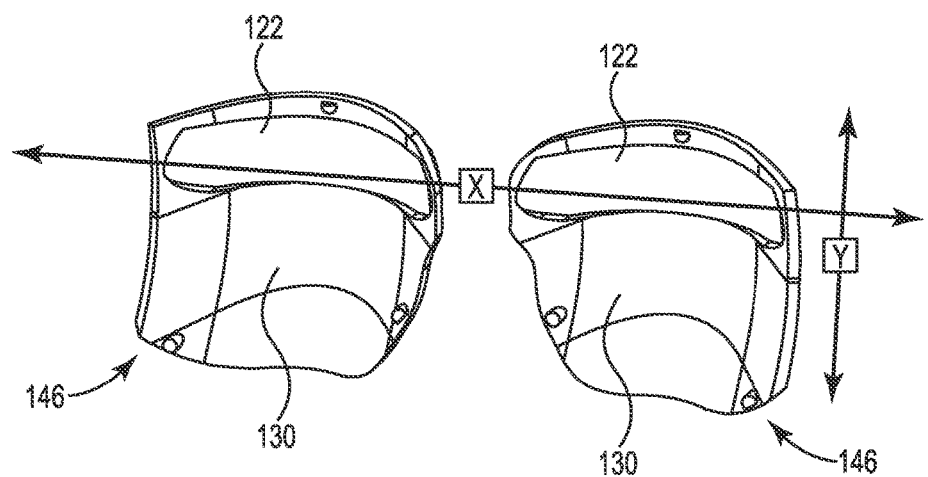
FIG. 17 is a rear isometric view of two exemplary compound lens elements utilized in a head-mounted display according to one embodiment.

FIGS. 16 and 17 depict structural features of the HMD 102 that define the optical path 114. FIG. 16 is a rear perspective view of a structural frame 134 that is essentially the mechanical backbone of the optical path 114. Embodiments maintain accurate and stable alignment of the mirrors 122, 126, 130 and the micro-display 116 because small errors in orientation or alignment of optical components will adversely affect the image seen by the user. An aspect of the optical structure is the structural frame 134. The structural frame 134 should have a very good strength but at the same time be extremely lightweight.

Thus, one attribute is the specific gravity of the structural frame 134. In one embodiment the specific gravity of the structural frame material is less than 3. In another embodiment the specific gravity is less than 2. In an exemplary embodiment the specific gravity is in the range of 1.5 to 2.0. The relatively low specific gravity of the material is employed for user comfort because any excess weight in eyeglasses is noticeably uncomfortable.

In an exemplary embodiment the structural frame 134 is formed from an injection molded or cast magnesium alloy. This enables a lightweight and high performance frame to be formed with a very efficient and low cost process. Typical magnesium alloys can include, in additional to Mg, certain amounts of aluminum, manganese, silicon, copper, zinc, iron and nickel to name a few other elements. Examples of such alloys include materials known by the following alloy names AM60A, AM60B, AZ71E, AZ91A, AZ91B, AZ91C, AZ91D, AND AZ91E to name a few examples.

The AM60A and AM60B alloys have a tensile strength of about 220 MPa (million Pascal) or about 32 KSI (thousand pounds per square inch). The yield strength is about 130 MPa. The elastic modulus in tension is about 45 GPa (Giga Pascal) or about 6.5 million PSI (pounds per square inch). What is outstanding about these materials is the low specific gravity of about 1.8 (1.8 grams per cubic centimeter measured at 20 degrees Celsius). Thus these alloys provide an exceptionally lightweight and strong material for the structural frame 134. The other cast magnesium alloys listed above have similar properties.

The structural frame 134 includes an upper rim 136 and a lower rim 138 with openings 140 defined there between. The upper rim 136 defines an upper portion of the structural frame 134 with respect to the Y-axis. The lower rim 138 defines a lower portion of the structural frame 134 with respect to the Y-axis.

Referring to FIG. 16, two pockets 142 extending downwardly with respect to the Y-axis are defined in a portion of upper rim 136. Each pocket 142 is configured to receive a micro-display mechanism 108. At a lower or distal extent of each pocket 142 with respect to the Y-axis is a mount 144 configured to support an M2 mirror 126.

Openings 140 in structural frame 134 are each configured to receive and support a compound optical element 146.

As shown in FIG. 17, compound optical elements 146 are primarily disposed along the X and Y-axes although they both have a concave geometry with respect to the optical path 114. Each of compound optical elements 146 are "compound" in the sense that they each have two different optical elements, including an M1 mirror 122 and an M3 mirror 130. In an exemplary embodiment, compound optical elements 146 are formed of an optically clear, light weight and highly dimensionally stable polymer from the cyclo olefin polymer (COP) family.

An example material used for the compound optical element 146 and the M2 mirror are ZEONEX F52R. Features to the material are: extremely low birefringence and excellent stability under severe conditions (high temperature and high humidity). The refractive index is 1.535. The Birefringence ratio is 0.5. The glass transition temperature is 156 degrees Celsius.

The M1 mirror 122 and the M2 mirror 126 are both opaque and as close to 100% reflective as possible in order to maximize optical efficiency of the light path 114. On the other hand, the M3 mirror 130 is partially reflective and allows external light from outside compound optical element 146 to pass there through and reach the user's eye. An electrochromic covering is used in conjunction with compound optical element 146 to allow a user to vary the amount of environmental light that may reach compound optical element 146.

In an exemplary embodiment the clear material of the compound optical element 146 has a zero optical power to allow a user to have a neutral, undistorted forward vision to the "outside world." The frequency response of all mirrored surfaces are as flat as possible in the 400 nm to 800 nm visible optical band.

In an alternative embodiment the M1 and M3 mirrors can be formed from two different optical elements. This would enable decoupling the manufacture of the two optical elements but would add some complexity to the overall assembly. The functions and properties of the separate optical elements would be essentially the same as their integrated counterparts.

As can be seen, the structural frame 134 performs a number of functions including supporting and holding all optical components of optical path 114 in alignment including the micro-displays 116, the compound optical elements 146, and the M2 mirrors 126. The assembly of the structural frame 134 and the optical components provides a rigid, accurate, and dimensionally stable optical path 114 while being very lightweight and comfortable for a user. This optical assembly as described with respect to FIGS. 16 and 17 enables the field of view (FOV) values described with respect with FIGS. 14 and 15 while being very compact and lightweight.

Micro-Display Mechanism

A compact and accurate optical path alignment mechanism is provided for HMD 102. The optical path includes a micro-display and at least one optical element that transmits an image from the micro-display to the user's eye. The alignment mechanism is configured to accommodate the user's pupil location along two axes: (1) a Z-axis that is generally along the user's line of site, which corresponds to a focal length of the optical path; and (2) an X-axis that is horizontal and transverse to the line of site, which corresponds to a interpupillary distance (IPD) for the user. The alignment mechanism provides this accommodation by discretely moving the micro-display along these two axes.

This mechanical method of varying the IPD allows the entire optical assembly to remain stationary in the eyeglass frame while providing a two-axis adjustment; front-to-back for focal length adjustment, and left to right for IPD adjustment. The micro-display holding mechanism moves the display laterally (left or right) relative to the M1 mirror. Due to the geometry of the M1 mirror, being primarily a bi-concave reflector, when the centerline of the display is shifted left or right on the horizontal plane, as the light rays from the display enter the M1 off-center, the output ray bundle is shifted left or right, causing the distance from the ray bundle to the centerline of the display to change.

In an exemplary embodiment, the entire micro-display mechanism fits into an envelope of less than 30 mm in X direction (left to right), less than 15 mm in the Z direction (along the line of sight of the user) and less than 20 mm in the Y direction (perpendicular to X and Z). In a further exemplary embodiment the envelope size of the display mechanism assembly is: 29 mm in X, 13.85 mm in Z, and 18 mm in Y.

Figure 18A:
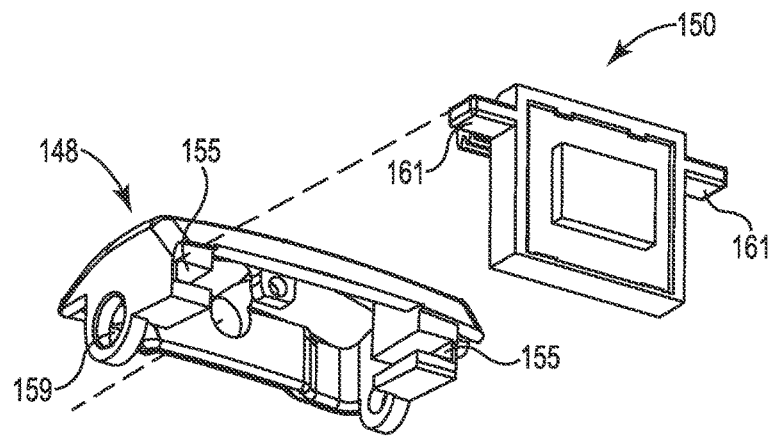
FIG. 18A is an exploded isometric view of a micro-display holder being assembled to a carriage according to one embodiment.
Figure 18B:
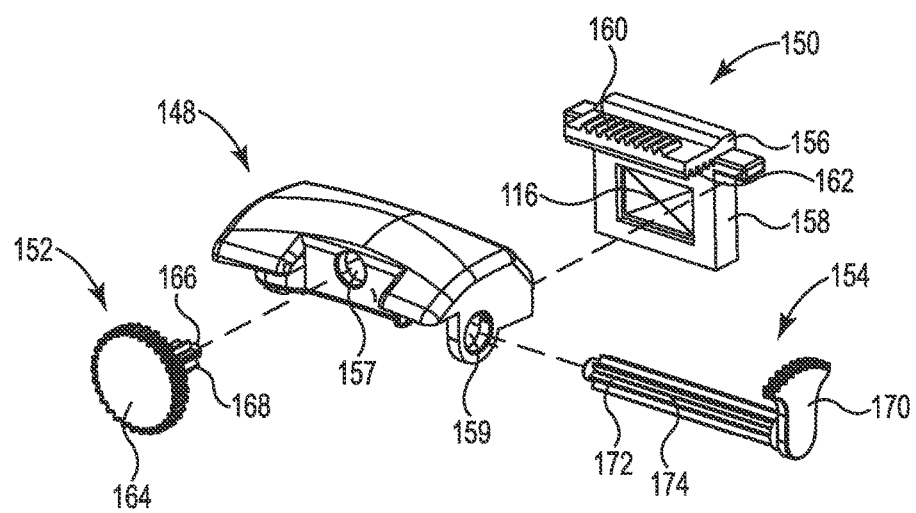
FIG. 18B is an exploded isometric view of the assembly of a micro-display mechanism according to one embodiment.

FIGS. 18A-F depict various views of micro-display mechanism 108. FIGS. 18A and 18B depict micro-display mechanism 108 in exploded form to illustrate various elements of and an assembly process for micro-display mechanism 108. Micro-display mechanism 108 includes carriage 148, micro-display holder 150, X-gear 152, and Z-gear 154. Carriage 148 defines slots 155 for constraining motion of the micro-display holder 150, opening 157 for receiving a shaft 166 of X-gear 152 and openings 159 for receiving shaft 172 of Z-gear 154.

Micro-display holder 150 includes upper portion 156 and lower portion 158. Lower portion 158 extends downwardly with respect to axis Y from carriage 148 and supports micro-display 116. Upper portion 156 includes upwardly extending teeth 160 and downwardly extending teeth 162. Micro-display holder 150 also includes outwardly extending tabs 161 to be received into slots 155 of carriage 148.

X-gear 152 includes a user-manipulation portion 164 attached to shaft 166. Shaft 166 includes radially extending teeth 168 for engagement with upwardly extending teeth 160 of micro-display holder 150. Z-gear 154 includes a user-manipulation portion 170 attached to shaft 172. Shaft 172 includes radially extending teeth 174 for engagement with downwardly extending teeth 162 of micro-display holder 150.

FIGS. 18A-B depict the assembly of micro-display mechanism 108. At the illustrated stage of assembly micro-display 116 is already attached to lower portion 158 of micro-display holder 150. The remaining steps include:

(1) The upper portion 156 of micro-display holder 150 is assembled to carriage 148. This step includes tabs 161 being received into slots 155 along the Z-axis. Once tabs 161 are fully received into slots 155, the motion of micro-display holder 150 (and hence micro-display 116) with respect to carriage 148 is constrained to user-manipulated motion along the X-axis and Z-axis while rotational motion is restrained.

(2) The Z-gear shaft 172 is inserted into openings 159 of carriage 148 along the X-axis. As a result of this insertion the radially extending teeth 174 of shaft 172 engage downwardly extending teeth 162 of micro-display holder 150.

(3) The X-gear shaft 166 is inserted into opening 157 of carriage 148 along the Z-axis. As a result of this insertion the radially extending teeth 168 of shaft 166 engage upwardly extending teeth 160 of micro-display holder 150. This engagement forms a rack and pinion action between X-gear 152 and the upper portion 156 of micro-display holder 150.

Figure 18C:
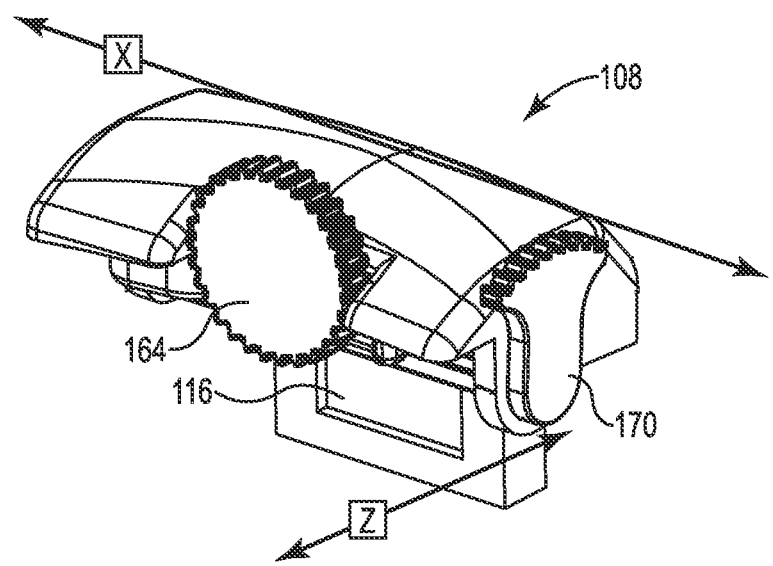
FIG. 18C is an isometric view of a micro-display movement mechanism according to one embodiment.

FIG. 18C depicts micro-display mechanism 108 in fully assembled form along with X and Z axes. Twisting the user manipulation portion 164 of the X-gear 152 (FIG. 18B) moves the display 116 along the X-axis to adjust inter-pupil distance (IPD). Manipulating the user manipulation portion 170 of the Z-gear 154 (FIG. 18B) moves the display 116 along Z-axis to adjust the focal point of the optical path 114.

The entire micro-display mechanism 108 fits into an envelope of less than 40 mm (millimeters) in X (left to right), less than 20 mm in Z (along the line of sight of the user) and less than 30 mm in Y (perpendicular to X and Z). In one embodiment the micro-display fits into an envelope of less than 35 mm in X, less than 15 mm in Z, and less than 20 mm in Y. In a further exemplary embodiment the envelope size of the micro-display mechanism is: 29 mm in X, 13.9 mm in Z, and 18 mm in Y. Reducing the size is particularly beneficial for users who are consumers who will find a bulky head mounted display to be objectionable.

Figure 18D:
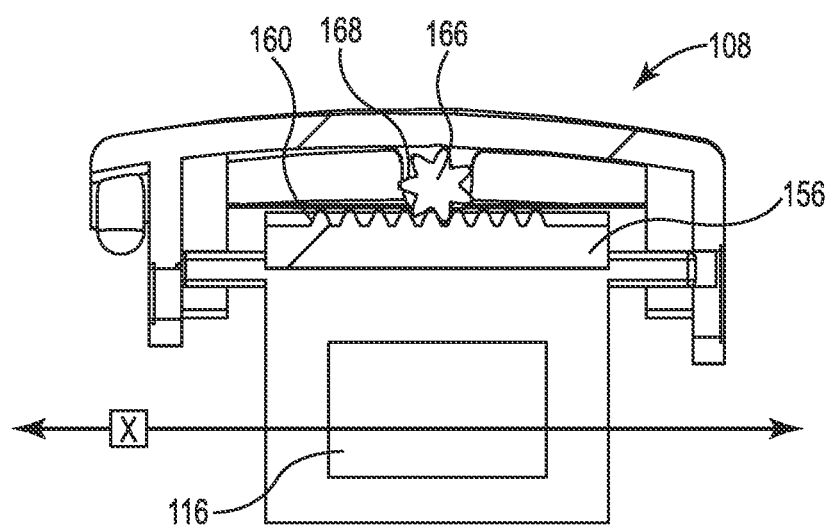
FIG. 18D is a rear view of a micro-display mechanism depicting the action of an X-gear upon a micro-display holder according to one embodiment.

FIG. 18D is a back view of micro-display mechanism 108 illustrating the action of X-gear 152. The upper portion 156 of micro-display holder 150 and the shaft 166 of X-gear 152 form a rack and pinion action. This rack and pinion action includes the engagement of radially extending teeth 168 of shaft 166 and upwardly extending teeth 160 of upper portion 156. This engagement allows rotational motion of shaft 166 to induce linear motion of upper portion 156 in X. This rack and pinion arrangement allows twisting of user manipulation portion 164 to translate micro-display 116 back and forth along the X-axis to line up a light beam originating from micro-display 116 with a user's pupil in the X-direction. This adjustment applied to both left and right micro-display mechanisms thereby adjusts the IPD (inter-pupil distance).

Figure 18E:
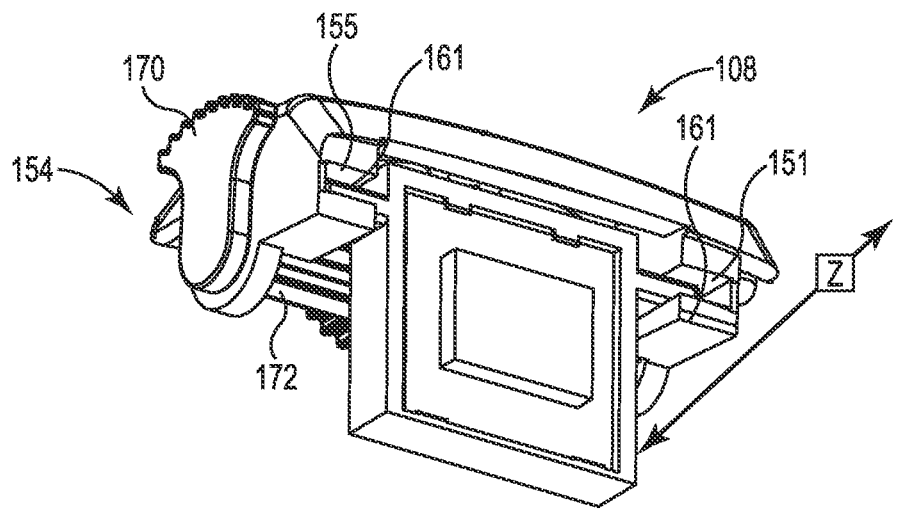
FIG. 18E is an isometric view of a micro-display mechanism depicting an internal mechanical constraint according to one embodiment.

FIG. 18E depicts an engagement between the tabs 161 of micro-display holder 150 and slots 155 of carriage 148 which constrains the motion of micro-display holder 150. The constraint is to linear motion along X and Z. The engagement constrains motion of micro-display holder 150 to the Z axis in response to manipulation of portion 170 of Z-gear 154.

Figure 18F:
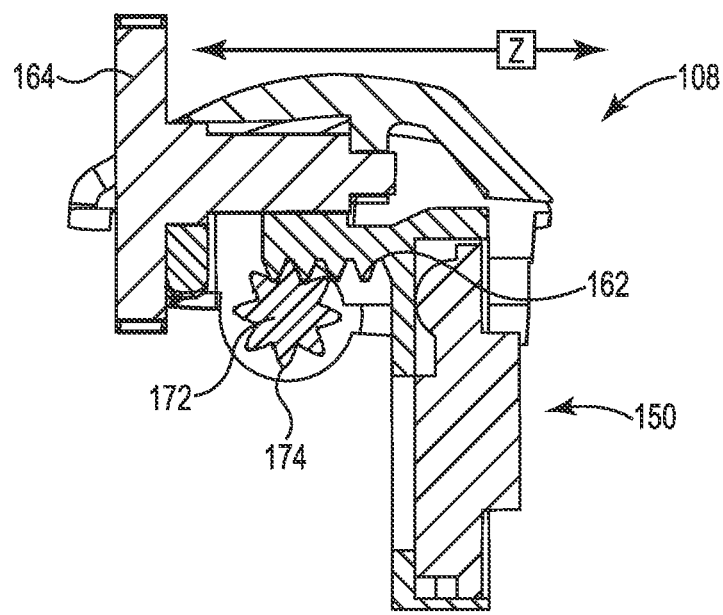
FIG. 18F is a side view of a micro-display depicting the action of a Z-gear upon a micro-display holder according to one embodiment.

FIG. 18F depicts the action of Z-gear 154 upon micro-display holder 150. Manipulation of portion 170 (FIG. 18E) causes rotation of shaft 172 of Z-gear 154. Radially extending teeth 174 of Z-gear 54 engage downwardly extending teeth 162 of micro-display holder 150 so that rotation of shaft 172 translates micro-display holder 150 along the Z axis. Motion of micro-display holder along Z adjusts the focal point of light rays reaching the user's eye from micro-display 116.

HMD Assembly Process

An efficient design and manufacturing process provides a very compact, dimensionally accurate, dimensionally stable, and impact resistant HMD. The design includes a rigid and high modulus structural frame that secures and provides a stable support and alignment for optical components. A relatively lower modulus polymer outer frame is assembled to the rigid inner frame. The outer frame provides a dust cover for components mounted to the structural frame along with temple arms for securing the HMD to a user's head. The outer frame also provides a composite structure that withstands impact by virtue of the combination of the relatively lower modulus outer frame in combination with the higher modulus inner frame.

The optical components include a micro-display and at least one reflective optical element that are rigidly secured to the structural frame. An optical path is defined between the micro-display, the at least one optical element, and a user's eye. The micro-display and the at least one reflective optical element are rigidly secured to the structural frame before the structural frame is received into and assembled to the outer frame.

In an exemplary embodiment the optical elements include (1) a pair of compound lenses that each provide two of the reflective optical elements that form a portion of the light path and (2) a second mirror element. These lenses are directly secured to the structural frame via their alignment tabs and mating datums on the structural frame. The compound lenses and the mirror element may be secured to the structural frame using an adhesive.

In an exemplary embodiment the micro-display is integrated into a micro-display mechanism that allows for user adjustment of the interpupillary distance and focus. The micro-display mechanism is assembled to the structural frame by securing the micro-display mechanism into a mechanical pocket that is formed into the structural frame. The micro-display mechanism has alignment tabs integrated into its structure, which rest in mating datums in the structural frame.

This design allows for a very efficient assembly of the HMD. The design results in a lightweight, compact, precise, dimensionally stable, and impact resistant HMD that has not been achieved in any prior designs.

Figure 19:
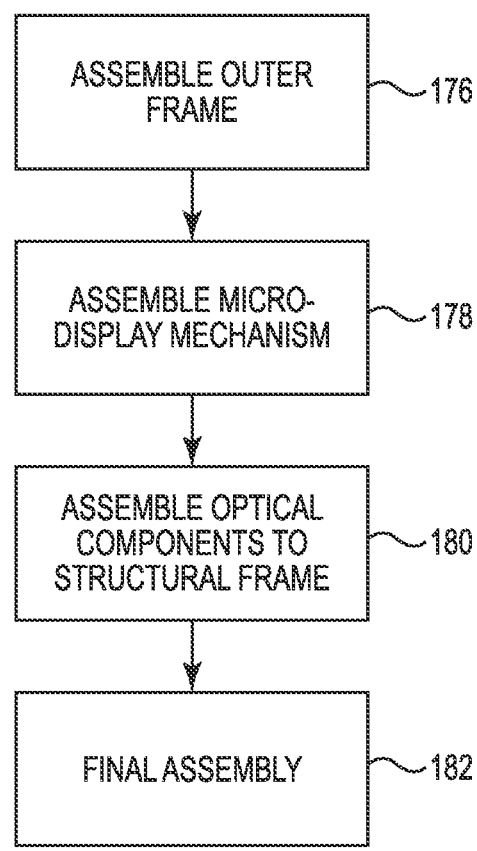
FIG. 19 is a flow chart representation of an exemplary process for assembling a head-mounted display according to one embodiment.
Figure 20:
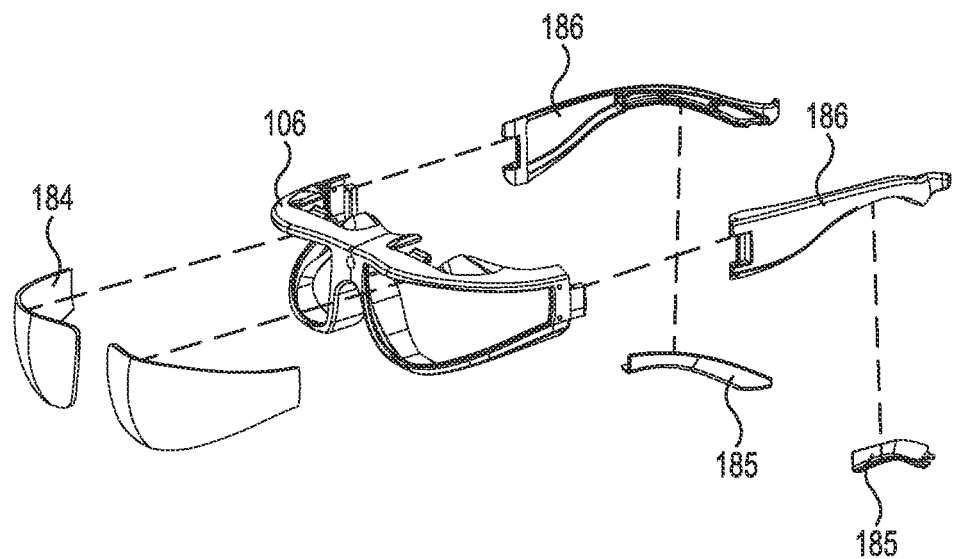
FIG. 20 is an isometric representation of an exemplary process for assembling an outer frame for a head-mounted display according to one embodiment.

An overall assembly process for the HMD 102 is depicted in FIG. 19. According to 176 the outer frame 106 is assembled. FIG. 20 depicts further details of the outer frame assembly. According to 178 the micro-display mechanism 108 is assembled as discussed with respect to FIGS. 18A and 18B. According to 180 the optical components are assembled to the structural frame for which there is further detail in FIG. 21. According to 182 final assembly of HMD 102 takes place as is depicted in FIG. 22.

Steps 176 and 178 do not need to be done in any particular order. However, step 178 needs to be performed before step 180 and step 180 needs to be performed before step 182.

Step 176 of FIG. 19 is depicted in additional detail according to FIG. 20 which illustrates an exemplary embodiment of a process for assembling outer frame 106. This exemplary process includes the following steps:

(1) Electro-transmissive lenses 184 are attached to frame 106. Lenses 184 function as both a dust covering and as a way of modulating light that may enter the HMD 102. In one embodiment the lenses are secured by an adhesive.

(2) Rubber tips 185 are attached to temple arms 186. (3) Temple arms 186 are attached to outer frame 106.

An exemplary embodiment of step 178 has already been described with respect to FIGS. 18A and 18B. Step 180 of FIG. 19 is depicted according to FIG. 21 which is an exemplary process for assembling optical components to structural frame 134. The illustrated process involves the following steps:

(1) Left and right M2 mirrors 126 are attached to mounts 144. In an exemplary embodiment the mirrors are attached with an adhesive.

(2) Left and right compound lenses 146 are attached to frame 134. After attachment, the compound lenses 146 each cover a portion of one opening 140. In an exemplary embodiment the lenses 146 are secured to the frame 134 using an adhesive.

(3) Left and right micro-display mechanisms are lowered along the Y-axis into left and right pockets 142 respectively. After assembly an upper surface of carriage 148 (FIG. 18A) is exposed above each pocket 142 and the lower portion 158 (FIG. 18B) of each micro display mechanism 108 extends downwardly into pocket 142.

Figure 21:
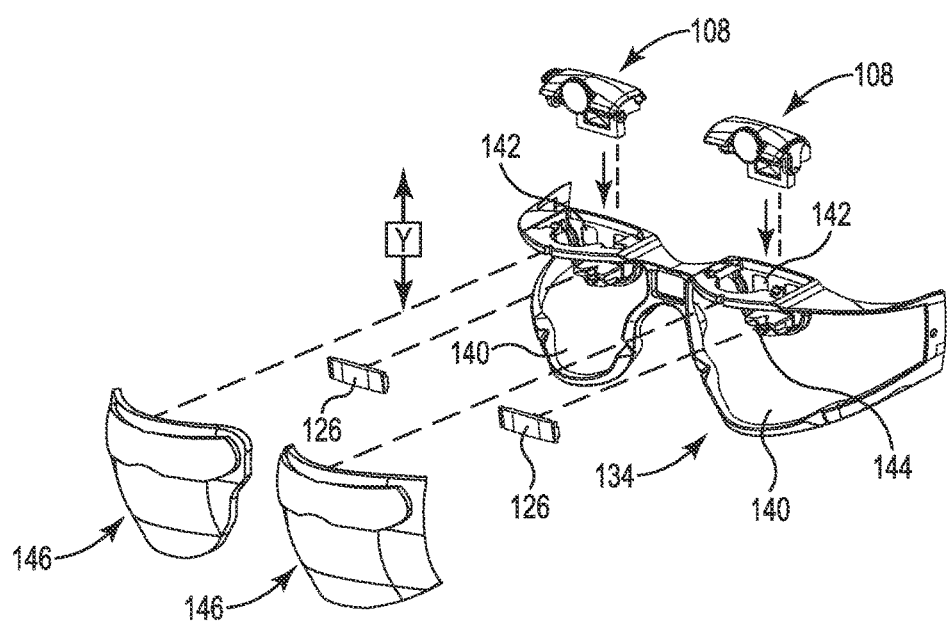
FIG. 21 is an isometric representation of an exemplary process for assembling optical components to a structural frame for a head-mounted display according to one embodiment.
Figure 22:
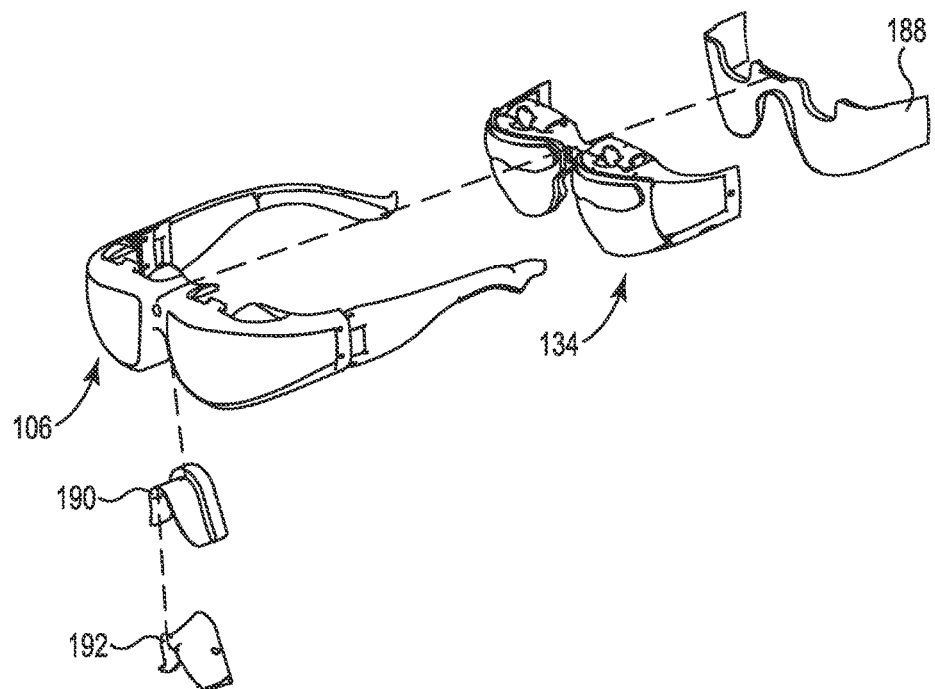
FIG. 22 is an isometric representation of an exemplary process for assembling a head-mounted display according to one embodiment.

Step 182 of FIG. 19 is depicted according to FIG. 22 which is an exemplary final assembly process for HMD 102. The illustrated process has the following steps:

(1) The now-assembled structural frame 134, as assembled according to FIG. 21, is received into the outer frame 106. According to FIG. 22 structural frame 134 is received into outer frame 106 along the Z-axis. In an exemplary embodiment the structural frame is secured to the outer frame 106 using an adhesive.

(2) A dust cover 188 is secured to a rearward side of the outer frame 106. In an exemplary embodiment the dust cover 188 is secured to the outer frame 106 using an adhesive. Because compound lens 146 (FIG. 21) does not completely cover openings 140, the front and rear dust covers (not shown) and 188 respectively are employed for protecting the optical path 114 components from dust and other contamination.

(3) Nose bridge 190 is attached to outer frame 106. (4) Nose insert 192 is attached to nose bridge 190. Nose bridge 190 and nose insert 192 enable HMD 102 to be customized to a wide range of user nose geometries.

Figure 23:
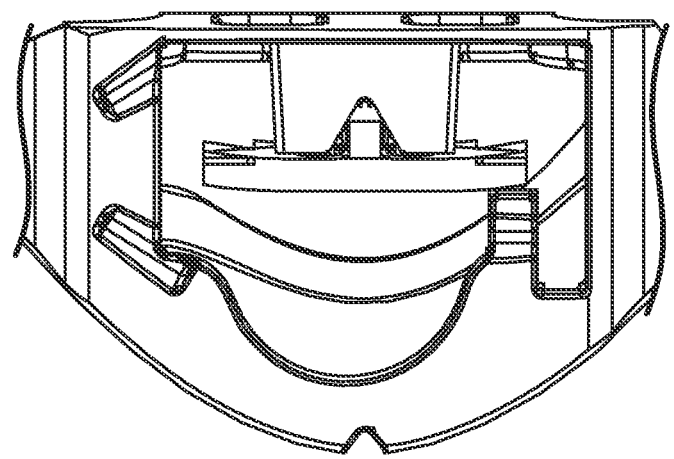
FIG. 23 is a first bottom view of a structural frame showing tabs from the optical elements positioned within the notched datum positioning mounts of the structural frame according to one embodiment.

FIG. 23 is a first bottom view of a structural frame showing tabs from the optical elements positioned within the notched datum positioning mounts of the structural frame according to one embodiment.

Figure 24:
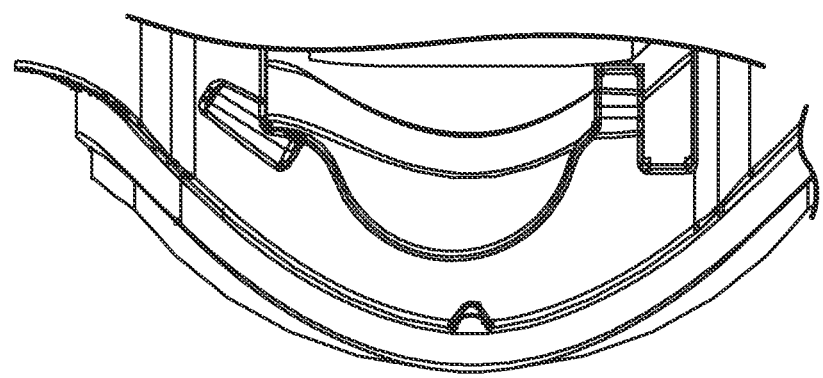
FIG. 24 is a second bottom view of a structural frame showing tabs from the optical elements positioned within the notched datum positioning mounts of the structural frame according to one embodiment.

FIG. 24 is a second bottom view of a structural frame showing tabs from the optical elements positioned within the notched datum positioning mounts of the structural frame according to one embodiment.

As a person skilled in the art will recognize from the previous detailed description and from the figures and claims, modifications and changes can be made to embodiments of the invention without departing from the scope of the disclosure and claims.

What is claimed is:

1. A head mounted display device comprising:
a structural frame arranged generally along a X-axis and a Y-axis for viewing along a Z-axis, the X, Y, and Z axes being mutually perpendicular;
a micro-display coupled to the structural frame, and configured to project visual content in a substantially forward direction along the Z-axis away from a user; and
a group of one or more optical elements with reflective optical surfaces coupled to the structural frame and respectively positioned on a front side of the micro-display with each of the reflective optical surfaces of the group of optical elements symmetrical with respect to the Y-axis and freeform with respect to the X-axis to reflectively guide a light ray bundle in a non-pupil forming optical path from the micro-display to a user's eye to provide an image to the user's eye such that the light rays of the light ray bundle entering the user's eye are essentially parallel to make the image visible to the user with varied positions of the user's pupil, the group of optical elements comprising:
a first reflective optical surface facing in a substantially rearward direction along the Z-axis;
a second reflective optical surface in a substantially forward direction along the Z-axis; and
a third reflective optical surface facing in a substantially rearward direction along the Z-axis, and the optical path comprising:

a first optical path segment directed forward along the Z-axis and downward along the Y-axis from the micro-display to the first reflective optical surface, a second optical path segment directed rearward with respect to the Z-axis downward with respect to the Y-axis from the first reflective optical surface to the second reflective optical surface, a third optical path segment directed forward along the Z-axis and downward along the Y-axis from the second reflective optical surface to the third reflective optical surface, and a fourth optical path segment directed rearward along the Z-axis and downward along the Y-axis from the third reflective optical surface.

2. The head mounted display device of claim 1, wherein the optical path has no stops such that there is no location in the optical path from the micro-display to the user's eye where the light rays of the light ray bundle converge and flip over.

3. The head mounted display device of claim 1, wherein the optical path utilizes the user's pupil as a stop.

4. The head mounted display device of claim 1, wherein the optical path is alternately divergent and convergent between the micro-display and the user's eye.

5. The head mounted display device of claim 1, wherein the reflective optical surfaces of the group of optical elements are alternately concave and convex.

6. The head mounted display device of claim 1, wherein the group of optical elements comprise:
a first mirror with reflective optical surface facing in a substantially rearward direction along the Z-axis;
a second mirror with a reflective optical surface facing in a substantially forward direction along the Z-axis; and
a third mirror with reflective optical surface facing in a substantially rearward direction along the Z-axis.

7. The head mounted display device of claim 6, wherein the reflective optical surface of the first and third mirrors is a concave reflective optical surface and the reflective optical surface of the second mirror is a convex reflective optical surface.

8. The head mounted display device of claim 6, wherein the first and third mirrors are formed in a compound optical element.

9. The head mounted display device of claim 1 comprising:
a second micro-display coupled to the structural frame and configured to project visual content in a substantially forward direction along the Z-axis away from the user; and
a second group of one or more optical elements with reflective optical surfaces coupled to the structural frame and respectively positioned on the front side of the second micro-display to reflectively guide a second light ray bundle in a second non-pupil forming optical path from the second micro-display to a second user's eye to provide a second image to the second user's eye such that the light rays of the second light ray bundle entering the second user's eye are essentially parallel to make the second image visible to the user with varied positions of the user's second pupil.

10. The head mounted display device of claim 9, wherein the head mounted display device is configured to provide a field of view of more than 40 degrees with a full overlap of the image and the second image and provide a field of view of more than 80 degrees with a zero overlap of the image and the second image.

11. The head mounted display device of claim 9, wherein the head mounted display device is configured to provide a field of view of more than 50 degrees with a full overlap of the image and the second image and provide a field of view of more than 100 degrees with a zero overlap of the image and the second image.

12. The head mounted display device of claim 9, wherein the head mounted display device is configured to provide a field of view of up to 60 degrees with a full overlap of the image and the second image and provide a field of view of up to 120 degrees with a zero overlap of the image and the second image.

13. The head mounted display device of claim 9, wherein the head mounted display device is configured to provide a field of view of more than 60 degrees with a full overlap of the image and the second image and provide a field of view of more than 120 degrees with a zero overlap of the image and the second image.

14. A head mounted display device comprising:
a structural frame arranged generally along a X-axis and a Y-axis for viewing along a Z-axis, the X, Y, and Z axes being mutually perpendicular;
left and right micro-displays coupled to the structural frame, and configured to project visual content in a substantially forward direction along the Z-axis away from a user; and
left and right groups of one or more optical elements with reflective optical surfaces coupled to the structural frame and respectively positioned on a front side of the left and right micro-displays with each of the reflective optical surfaces of the left and right groups of optical elements symmetrical with respect to the Y-axis and freeform with respect to the X-axis to reflectively guide light ray bundles in non-pupil forming optical paths from the left and right micro-displays to a user's left and right eyes to respectively provide left and right images to the user's left and right eyes, wherein each of the reflective optical surfaces of the left and right groups of optical elements is freeform with respect to the X-axis and symmetrical with respect to the Y-axis, each of the left and right groups of optical elements comprising:
a first reflective optical surface facing in a substantially rearward direction along the Z-axis;
a second reflective optical surface facing in a substantially forward direction along the Z-axis; and
a third reflective optical surface facing in a substantially rearward direction along the Z-axis, and the optical paths comprising:
a first optical path segment directed forward along the Z-axis and downward along the Y-axis from the micro-display to the first reflective optical surface,
a second optical path segment directed rearward with respect to the Z-axis and downward with respect to the Y-axis from the first reflective optical surface to the second reflective optical surface,
a third optical path segment directed forward along the Z-axis and downward along the Y-axis from the second reflective optical surface to the third reflective optical surface, and
a fourth optical path segment directed rearward along the Z-axis and downward along the Y-axis from the third reflective optical surface;
wherein the head mounted display device is configured to provide a field of view of more than 40 degrees with a full overlap of the left image and the right image and provide a field of view of more than 80 degrees with a zero overlap of the left image and the right image.

15. The head mounted display device of claim 14, wherein the head mounted display device is configured to provide a field of view of more than 50 degrees with a full overlap of the left image and the right image and provide a field of view of more than 100 degrees with a zero overlap of the left image and the right image.

16. The head mounted display device of claim 14, wherein the head mounted display device is configured to provide a field of view of up to 60 degrees with a full overlap of the left image and the right image and provide a field of view of up to 120 degrees with a zero overlap of the left image and the right image.

17. The head mounted display device of claim 14, wherein the head mounted display device is configured to provide a field of view of more than 60 degrees with a full overlap of the left image and the right image and provide a field of view of more than 120 degrees with a zero overlap of the left image and the right image.

18. The head mounted display device of claim 14, wherein the optical paths have no stops such that there is no location in the optical paths from the left and right micro-displays to the user's left and right eyes where the light rays of the light ray bundles converge and flip over.

19. The head mounted display device of claim 14, wherein the optical paths are alternately divergent and convergent between the left and right micro-displays and the user's left and right eyes.

20. The head mounted display device of claim 14, wherein the reflective optical surfaces of the left and right groups of optical elements are alternately concave and convex.

* * * * *